(12) United States Patent
Ono

(10) Patent No.: US 8,476,380 B2
(45) Date of Patent: *Jul. 2, 2013

(54) ROOM TEMPERATURE CURABLE SILICON GROUP-CONTAINING POLYMER COMPOSITION

(75) Inventor: Kazuhisa Ono, Tokyo (JP)

(73) Assignee: Momentive Performance Materials Japan LLC, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/240,325

(22) Filed: Sep. 22, 2011

(65) Prior Publication Data

US 2012/0101228 A1    Apr. 26, 2012

Related U.S. Application Data

(63) Continuation of application No. 12/085,683, filed as application No. PCT/JP2006/324076 on Dec. 1, 2006, now Pat. No. 8,110,637.

(30) Foreign Application Priority Data

| Dec. 2, 2005 | (JP) | 2005-349952 |
| Jul. 14, 2006 | (JP) | 2006-193540 |
| Jul. 14, 2006 | (JP) | 2006-193541 |

(51) Int. Cl.
*C08L 71/02* (2006.01)

(52) U.S. Cl.
USPC .......... 525/477; 528/29; 528/34; 528/36; 528/38

(58) Field of Classification Search
None
See application file for complete search history.

(56) References Cited

U.S. PATENT DOCUMENTS

| 4,522,958 A * | 6/1985 | Das et al. ............... 523/212 |
| 5,011,900 A | 4/1991 | Yukimoto et al. |
| 5,223,583 A | 6/1993 | Higuchi et al. |
| 5,856,544 A * | 1/1999 | Czech et al. ............ 556/425 |
| 6,058,976 A * | 5/2000 | Le Rossignol et al. ...... 138/30 |
| 6,310,170 B1 * | 10/2001 | Johnston et al. ........... 528/38 |
| 6,310,637 B1 * | 10/2001 | Shimada et al. ........... 347/19 |
| 7,709,090 B2 | 5/2010 | Nover et al. |
| 7,994,262 B2 | 8/2011 | Kono |
| 8,110,637 B2 * | 2/2012 | Ono ..................... 525/477 |
| 2006/0036008 A1 * | 2/2006 | Langezaal et al. ........ 524/261 |
| 2008/0051517 A1 | 2/2008 | Okai et al. |
| 2009/0088523 A1 | 4/2009 | Ono |

FOREIGN PATENT DOCUMENTS

| EP | 0 345 800 A2 | 12/1989 |
| EP | 0 522 415 A1 | 1/1993 |
| JP | 46-027250 | 8/1971 |
| JP | 2-117954 A | 5/1990 |
| JP | 3-047825 A | 2/1991 |
| JP | 3-072527 A | 3/1991 |
| JP | 3-079627 A | 4/1991 |
| JP | 3-160053 A | 7/1991 |
| JP | 5-065400 A | 3/1993 |
| JP | 5-201724 A | 8/1993 |
| JP | 6-057122 A | 3/1994 |
| JP | 9-143360 A | 6/1997 |
| JP | 10-245482 | * 9/1998 |
| JP | 10-245482 A | 9/1998 |
| JP | 11-157833 A | 6/1999 |
| JP | 3343604 B2 | 8/2002 |
| JP | 2005-213446 A | 8/2005 |
| JP | 2006-143518 A | 6/2006 |
| WO | WO 01/30902 A1 * | 5/2001 |
| WO | WO 2005-071003 | 8/2005 |
| WO | WO 2005/095492 | 10/2005 |

OTHER PUBLICATIONS

Machine-generated translation of JP 10-245482 into English (no date).*
Office Action issued on May 27, 2011 by the Examiner in U.S. Appl. No. 12/085,683 (US 2009/0088523).
Office Action issued on Feb. 1, 2011 by the Examiner in U.S. Appl. No. 12/085,683 (US 2009/0088523).
Interview Summary issued on Sep. 2, 2011 by the Examiner in U.S. Appl. No. 12/085,683 (US 2009/0088523).

* cited by examiner

*Primary Examiner* — Marc Zimmer
(74) *Attorney, Agent, or Firm* — Foley & Lardner LLP

(57) ABSTRACT

Room temperature curable silicon group-containing polymer compositions comprising (A) a reactive silicon group-containing polymer obtained through a reaction between a polyoxypropylene polyol and a y-isocyanate propyltrialkoxysilane, (B) a curing catalyst, and (C) amino group-substituted alkoxysilane or a hydrolyzed and condensed product of an amino group-substituted alkoxysilane.

2 Claims, No Drawings

ROOM TEMPERATURE CURABLE SILICON GROUP-CONTAINING POLYMER COMPOSITION

TECHNICAL FIELD

The present invention relates to room temperature curable silicon group-containing polymer compositions which are effectively used as elastic adhesives, sealing materials, or coating materials.

BACKGROUND ART

Among reactive silicon group-containing organic polymers which are liquid at room temperature, there is one that cures by contacting moisture (hygroscopic moisture) in the air, to thereby produce a rubber-like elastic body, which requires no troublesome tasks such as weighing or mixing base polymers, cross-linking agents, catalysts and the like right before the usage, and there is no chance for an error in blending. Further, since being excellent in adhesiveness, it is widely used as an elastic adhesive and a coating material in the electric and electronic fields, as an architectural sealing material, and the like.

One-component room temperature curable polymer compositions in which amino group-substituted silanes (amino group-containing silane compounds) are blended as components for enhancing adhesiveness are proposed (For instance, refer to Patent Reference 1). The room temperature curable polymer composition is good in field workability since it has low inflammability and small harmful effect, and also its curing speed is not too fast. Further, as components for enhancing adhesiveness, various organic functional silane compounds, other than the amino group-substituted silanes are proposed.

However, in the room temperature curable polymer composition described in Patent Reference 1, although the initial adhesiveness is good, since it is poor in water resistance, specifically, in hot water resistance, the adhesiveness is significantly lowered in water immersion condition. Further, each of the aforesaid room temperature curable polymer compositions in which organic functional silane compounds other than the amino group-substituted silane are blended as the components for enhancing adhesiveness cannot attain a sufficient expression of adhesiveness.

Further, in organic polymers having reactive silicon groups, tackiness tends to be remained on a surface of a cured product, so that the surface of the cured product is contaminated by dirt, earth and sand, dust and the like adhered thereto, resulting that the appearance is apt to be impaired, which is disadvantageous.

In order to reduce such residual tack, conventionally, various studies have been conducted regarding a composition of silicon compounds, a selection of kinds of curing catalysts, air-curing and a blend of dry substance, and the like, and some proposals have been made. For example, there have been proposed a curable composition in which compound having silanol groups and compounds having air oxidation curing unsaturated groups are blended with oxyalkylene polymers having reactive silicon groups, to thereby improve non adhesiveness of dust and the like (stain-proof property) (for instance, refer to Patent Reference 2). Further, there have been proposed a room temperature curable composition in which light-curing substances and unsaturated compounds capable of reacting with oxygen in the air are blended with polyethers each having one or more of (a) reactive silicon group(s) in its molecule, to thereby enhance a contamination prevention effect (for instance, refer to Patent Reference 3). Furthermore, there has been made a proposal to improve the residual tack and further to enhance a weather resistance by blending acrylic compounds (for instance, refer to Patent Reference 4).

However, there has been a problem that during the storage of these curable compositions, a liquid separation and the decrease in adhesiveness are likely to occur. Further, since the curing property is hard to control, there have arisen problems such that not only the sufficient workability cannot be attained, but also fine cracks tend to be made on the surface of the cured product. There are some of the curable compositions which lack sufficient mechanical properties, durability, and the like of the cured products.

In addition, these compositions often require a control of modulus according to the usage, in which the composition with low modulus is needed especially when it is applied to a siding, or to a region where stress relief is required. It is hard to realize the low modulus in the curable compositions in which the residual tack is improved, and further, some of the curable compositions lack the sufficient mechanical properties, durability, and the like of the cured products. Further, the tack often remains on the surface of the cured product of the composition with low modulus. In reality, there have not been obtained curable compositions achieving both the improvement of residual tack and the low modulus.

Patent Reference 1: JP-B2 3343604 (Patent Publication)
Patent Reference 2: JP-A 02-117954 (KOKAI)
Patent Reference 3: JP-A 03-160053 (KOKAI)
Patent Reference 4: JP-A 05-065400 (KOKAI)

DISCLOSURE OF THE INVENTION

The present invention has been made to solve the aforementioned problems, and an object of the present invention is to provide room temperature curable silicon group-containing polymer compositions which are good in curing property, excellent in adhesiveness and storage stability, and good in water resistance, in which the adhesiveness is not decreased even under water immersion condition. Further, it is also an object of the present invention to provide room temperature curable silicon group-containing polymer compositions capable of controlling modulus so that a sufficient mechanical strength can be realized at low modulus, and eliminating a residual tack on a surface of a cured product. It is also an object of the present invention to provide room temperature curable silicon group-containing polymer compositions which are good in curing property so that the residual tack and fine cracks on the surface of the cured product are prevented from occurring, and are excellent in adhesiveness and storage stability so that the adhesiveness is not lowered even under the water immersion condition.

A first aspect of the present invention is a room temperature curable silicon group-containing polymer composition comprising: (A) a reactive silicon group-containing polymer obtained through a urethane reaction between polyoxypropylene polyol whose number average molecular weight is 500 to 50,000 and γ-isocyanate propyltrialkoxysilane, having a main chain being substantially composed of polyoxypropylene, and having a reactive silicon-containing group represented by a formula:

[Chemical Formula 1]

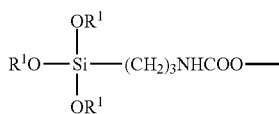
(1)

(wherein $R^1$s are the same or different and each represents an alkyl group having 1 to 4 carbons) at an end of the main chain, and based on 100 parts by weight of the reactive silicon group-containing polymer, (B) 0.01 to 10 parts by weight of a curing catalyst, and (C) 0.05 to 25 parts by weight of amino-functional organosiloxane.

A second aspect of the present invention is a room temperature curable silicon group-containing polymer composition comprising: (A) a mixture of polymers including (A1) a first reactive silicon group-containing polymer obtained through a urethane reaction between polyoxypropylene polyol whose viscosity is 500 mPa·s to 50,000 mPa·s at 25° C. and γ-isocyanate propyltrialkoxysilane, having a main chain being substantially composed of polyoxypropylene, and having a reactive silicon-containing group represented by a formula:

[Chemical Formula 2]

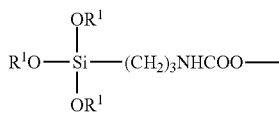
(1)

(wherein $R^1$s are the same or different and each represents an alkyl group having 1 to 4 carbons) at each of two or more ends of the main chain, and (A2) a second reactive silicon group-containing polymer obtained through a urethane reaction between hydroxypolyoxypropylene having a hydroxyl group at one end thereof whose viscosity is 100 mPa·s to 50,000 mPa·s at 25° C. and γ-isocyanate propyltrialkoxysilane, having a main chain being substantially composed of polyoxypropylene, and having a reactive silicon-containing group represented by a formula:

[Chemical Formula 3]

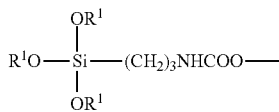
(1)

(wherein $R^1$s are the same or different and each represents an alkyl group having 1 to 4 carbons) at one side end of the main chain, and based on 100 parts by weight of the mixture of polymers, (B) 0.01 to 10 parts by weight of a curing catalyst, and (C) 0.05 to 25 parts by weight of amino-functional organosiloxane.

A third aspect of the present invention is a room temperature curable silicon group-containing polymer composition comprising: (A) a mixture of polymers including (A1) a first reactive silicon group-containing polymer obtained through a urethane reaction between polyoxypropylene polyol whose viscosity is 500 mPa·s to 50,000 mPa·s at 25° C. and γ-isocyanate propyltrialkoxysilane, having a main chain being substantially composed of polyoxypropylene, and having a reactive silicon-containing group represented by a formula:

[Chemical Formula 4]

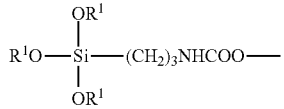
(1)

(wherein $R^1$s are the same or different and each represents an alkyl group having 1 to 4 carbons) at each of two or more ends of the main chain, and (A2) a second reactive silicon group-containing polymer obtained through a urethane reaction between hydroxypolyoxypropylene having a hydroxyl group at one end thereof whose viscosity is 100 mPa·s to 50,000 mPa·s at 25° C. and γ-isocyanate propyltrialkoxysilane, having a main chain being substantially composed of polyoxypropylene, and having a reactive silicon-containing group represented by a formula:

[Chemical Formula 5]

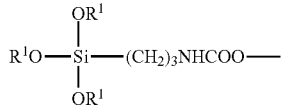
(1)

(wherein $R^1$s are the same or different and each represents an alkyl group having 1 to 4 carbons) at one side end of the main chain, and based on 100 parts by weight of the mixture of polymers, (B) 0.01 to 10 parts by weight of a curing catalyst, and (C1) 0.05 to 25 parts by weight of amino group-substituted alkoxysilane.

A fourth aspect of the present invention is a room temperature curable silicon group-containing polymer composition comprising: (A) a reactive silicon group-containing polymer obtained through a urethane reaction between polyoxypropylene polyol whose number average molecular weight is 500 to 50,000 and γ-isocyanate propyltrialkoxysilane, having a main chain being substantially composed of polyoxypropylene, and having a reactive silicon-containing group represented by a formula:

[Chemical Formula 6]

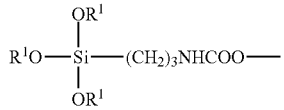
(1)

(wherein $R^1$s are the same or different and each represents an alkyl group having 1 to 4 carbons) at an end of the main chain, and based on 100 parts by weight of the reactive silicon group-containing polymer, (B) 0.01 to 10 parts by weight of a curing catalyst, (C) 0.05 to 25 parts by weight of amino-functional organosiloxane, and (D) 1 to 500 parts by weight of an inorganic filler being surface-treated with glycol that is liquid at room temperature.

A fifth aspect of the present invention is a room temperature curable silicon group-containing polymer composition comprising: (A) a reactive silicon group-containing polymer obtained through a urethane reaction between polyoxypropylene polyol whose number average molecular weight is 500 to 50,000 and γ-isocyanate propyltrialkoxysilane, having a main chain being substantially composed of polyoxypropylene, and having a reactive silicon-containing group represented by a formula:

[Chemical Formula 7]

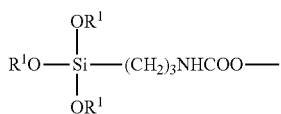
(1)

(wherein $R^1$s are the same or different and each represents an alkyl group having 1 to 4 carbons) at an end of the main chain, and based on 100 parts by weight of the reactive silicon group-containing polymer, (B) 0.01 to 10 parts by weight of a curing catalyst, (C1) 0.05 to 25 parts by weight of amino group-substituted alkoxysilane, and (D) 1 to 500 parts by weight of an inorganic filler being surface-treated with glycol that is liquid at room temperature.

A sixth aspect of the present invention is a room temperature curable silicon group-containing polymer composition comprising: (A) a polyoxyalkylene polymer having a hydrolyzable silicon group whose number average molecular weight is 500 to 50,000, and based on 100 parts by weight thereof, (B) 0.01 to 10 parts by weight of a curing catalyst, (C2) 0.05 to 25 parts by weight of amino group-substituted alkoxysilane and/or its hydrolyzed and condensed product, and (D) 1 to 500 parts by weight of an inorganic filler being surface-treated with glycol that is liquid at room temperature.

The room temperature curable silicon group-containing polymer composition according to the first aspect of the present invention can attain good expression of initial adhesiveness and is excellent in water resistance, especially in hot water resistance, so that the degree of decrease in adhesiveness is quite small even under the state of being immersed in water such as condensation water.

According to the room temperature curable silicon group-containing polymer compositions according to the second aspect and the third aspect of the present invention, the residual tack on the surface of the cured product is improved and the modulus can be controlled, so that the sufficient mechanical strength can be realized at the low modulus.

Furthermore, the room temperature curable silicon group-containing polymer compositions according to the fourth aspect to the sixth aspect of the present invention can attain good expression of initial adhesiveness, and are excellent in water resistance, especially in hot water resistance, so that the degree of decrease in adhesiveness is small even under the water immersion condition. Further, the residual tack and the fine cracks are prevented from occurring on the surface of the cured product, and because of good thixotropy, the workability is excellent.

BEST MODE FOR CARRYING OUT THE INVENTION

Next, preferred embodiments of the present invention will be explained. It should be noted that the present invention is not to be limited to the following embodiments.

First Embodiment

A room temperature curable silicon group-containing polymer composition according to a first embodiment of the present invention comprises (A) a reactive silicon group-containing polymer, and based on 100 parts by weight thereof, (B) 0.01 to 10 parts by weight of a curing catalyst, and (C) 0.05 to 25 parts by weight of amino-functional organosiloxane. The reactive silicon group-containing polymer being the component (A) is obtained through a urethane reaction between (a1) polyoxypropylene polyol whose number average molecular weight is 500 to 50,000 and (a2) γ-isocyanate propyltrialkoxysilane.

One component for preparing the component (A), namely, the (a1) polyoxypropylene polyol has a plurality of oxypropylene units. In the first embodiment, among the commercially available polyoxypropylene polyols being widely used as a urethane raw material, the one with the number average molecular weight of 500 to 50,000 is applied. Concrete examples include polyoxypropylene polyols such as polyoxypropylene diol, polyoxypropylene triol and polyoxypropylene tetraol, polyols being copolymerized polyols of polyoxypropylene and other alkylenes such as polyoxy (propylene.ethylene) copolymerized polyol in which the oxypropylene units account for more than 50 mol %, substantial polyoxypropylene polyols in which polyoxypropylene polyols are subjected to molecular weight jumping using diisocyanates or the like, to thereby increase the molecular weight, and the like. Note that for the copolymerized polyols of polyoxypropylene and other alkylenes, not only a block-type polymer but also polyoxypropylene polyol with other alkylene oxides added thereto can be used.

In the first embodiment, each of these polyoxypropylene polyols is necessary to have a hydroxyl group at an end of its molecule. Among these polyoxypropylene polyols, the one being excellent in fast curing property and storage stability is polyoxypropylene diol with number average molecular weight of 5,000 to 30,000, and as concrete examples thereof, PREMINOL 4010, PREMINOL 4019 (both are the trade names of Asahi Glass Co., Ltd.), and the like can be cited. Polyoxypropylene diol having a molecular weight that falls into the above range achieved by making polyoxypropylene diol with low molecular weight go through the molecular weight jumping reaction using diisocyanate, can also be suitably used.

In the first embodiment, the other component for preparing the (A) reactive silicon group-containing polymer is the (a2) γ-isocyanate propyltrialkoxysilane. Especially suitably used is γ-isocyanate propyltrimethoxysilane. The blending ratio of both the components is not limited in particular, and to blend both of them so that a ratio of the number of isocyanate groups (NCO) of the (a2) γ-isocyanate propyltrialkoxysilane to the number of hydroxyl groups (OH) of the (a1) polyoxypropylene polyol (hereinafter, refer to as NCO/OH ratio) falls into a range of 0.6 to 1.2, 0.8 to 1.0, is preferable.

Concretely, when one kind of polyoxypropylene polyol is used, a hydroxyl value of the polyol is calculated, and when two kinds or more of polyoxypropylene polyols are used, a hydroxyl value of the mixed polyol is calculated based on a weighted average, to thereby calculate the amount of γ-isocyanate propyltrialkoxysilane to be reacted so that the NCO/OH ratio falls into the above range with respect to 100 parts by weight of the polyol.

Concerning the determination of the blending amount of the γ-isocyanate propyltrialkoxysilane with respect to the polyol, when the NCO/OH ratio becomes smaller than 0.6, the fast curing property of the obtained silicon group-containing polymer is lowered, and the water resistance is also lowered due to the residue of the hydroxyl group, which is unfavorable. Meanwhile, when the NCO/OH ratio becomes larger than 1.2, the storage stability is lowered due to the residue of the γ-isocyanate propyltrialkoxysilane. When the aforementioned (a1) polyoxypropylene polyol and (a2) γ-isocyanate propyltrialkoxysilane are blended so that the NCO/OH ratio falls into a range of 0.8 to 1.0, it is possible to obtain the room temperature curable silicon group-containing polymer composition which is quite excellent in the fast curing property, the storage stability, the water resistance, and the like.

For carrying out the urethane reaction, each of a predetermined amount of the (a1) polyoxypropylene polyol and (a2) γ-isocyanate propyltrialkoxysilane is blended, and stirred while being heated at, for example, 60° C. to 100° C. for several hours. This reaction is preferably carried out in an inert gas such as nitrogen gas. Further, in order to catalyze the reaction, a very small amount of urethane polymerization catalyst such as dibutyltin dilaurylate can be added in the beginning or in the middle of the urethane reaction. A point where a value approximate to the theoretical amount of NCO or the theoretical amount of hydroxyl value calculated based on the NCO/OH ratio is made to be an end point of the reaction, to thereby determine the completion of the reaction.

When a mixture of polyoxypropylene diol with a specific molecular weight and polyoxypropylene polyol except that polyoxypropylene diol is used as the (a1) polyoxypropylene polyol, the reactive silicon group-containing polymer being the component (A) may be produced by making the mixture go through the urethane reaction with the (a2) γ-isocyanate propyltrialkoxysilane, or by making the polyoxypropylene diol with the specific molecular weight and the polyoxypropylene polyol except that polyoxypropylene diol individually go through the urethane reaction with the (a2) γ-isocyanate propyltrialkoxysilane and mixing the obtained urethane compounds.

As a preferable mixing ratio, per 100 parts by weight of the polyoxypropylene diol with the specific molecular weight, 5 to 200 parts by weight of the polyoxypropylene polyol except that polyoxypropylene diol is mixed. If the mixing ratio is within the above range, properties such as the storage stability, the fast curing property, and the like of the obtained (A) reactive silicon group-containing polymer are not impaired at all.

Thus obtained (A) reactive silicon group-containing polymer has a main chain being substantially composed of polyoxypropylene, and a trialkoxysilyl group as a reactive silicon group-containing group, in which a methylene bond and one urethane bond are located at chemically bonded portions between the trialkoxysilyl group and the main chains.

The reactive silicon group-containing polymer being the component (A) is represented by the general formula:

[Chemical Formula 8]

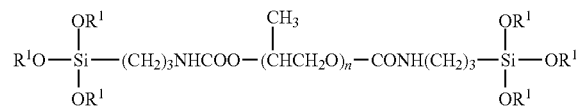

(4)

(wherein R$^1$s are the same or different and each represents an alkyl group having 1 to 4 carbons. n is a positive integer which satisfies 86<n<344). Especially preferably, all of the R$^1$s are methyl groups. The reactive silicon group-containing polymer is obtained by using γ-isocyanate propyltrimethoxysilane as the γ-isocyanate propyltrialkoxysilane being the component (a2), and is good in the fast curing property and excellent in the storage stability.

When the number average molecule weight is made to be substantially 5,000 to 30,000 through the molecular weight jumping reaction between polyoxypropylene diol with low molecular weight and diisocyanates, portions of the main chain structure may be mutually bonded via one or more of chemical bond(s) other than (an) ether bond(s), such as (a) urethane bond(s), but, as long as a polymer having a hydroxyl group at one end of its molecule and having a trimethoxysilyl group obtained through the reaction between the hydroxyl group of the polyoxypropylene diol that went through the molecular weight jumping reaction and the isocyanate group of the γ-isocyanate propyltrimethoxysilane can be ultimately obtained, the polymer is also included in the (A) reactive silicon group-containing polymer of the present invention.

In order to catalyze the cure, the (B) curing catalyst is comprised in the room temperature curable silicon group-containing polymer composition of the first embodiment. For the curing catalyst, known silanol condensation catalysts can be used. For instance, there can be mentioned metallic catalysts such as titanate esters such as tetrabutyl titanate and tetrapropyl titanate, organotin compounds such as dibutyltin dilaurate, dibutyltin maleate, and dibutyltin diacetate, tin carboxylates such as tin octylate, tin naphthate, tin laurate, and tin felzate, reaction products from dibutyltin oxide and phthalate ester, dibutyltin diacetylacetonate, organoaluminum compounds such as aluminum trisacetylacetonate, aluminum trisethylacetoacetate and diisopropoxyaluminum ethylacetoacetate, chelate compounds such as zirconium tetraacetylacetonate and titanium tetraacetylacetonate, lead octylate, iron naphthate, and bismuth compounds such as bismuth-tris (neodecanoate) and bismuth-tris (2-ethylhexoate).

These metallic catalysts may be used singly, or two or more of them may be used in combination. Further, known amine catalysts such as laurylamine may also be used. In the embodiment, among the above curing catalysts, the use of tin carboxylates or organotin compounds such as dibutyltin dilaurate, dibutyltin maleate, dibutyltin diacetate, tin octylate, tin naphthate, tin laurate, and tin felzate, reaction products from dibutyltin oxide and phthalate ester, and tin-based catalysts such as dibutyltin diacetylacetonate is particularly preferable.

The curing catalyst being the component (B) is blended in an amount of 0.01 to 10 parts by weight, preferably 0.05 to 8.0 parts by weight, and more preferably 0.1 to 5.0 parts by weight per 100 parts by weight of the aforementioned (A) reactive silicon group-containing polymer.

In the room temperature curable silicon group-containing polymer composition of the first embodiment, the (C) amino-functional organosiloxane is comprised together with the above-described (B) curing catalyst. For the amino-functional organosiloxane being the component (C), the use of hydrolyzed and condensed product of amino group-substituted alkoxysilanes is preferable. Here, for the amino group-substituted alkoxysilanes (hereinafter, also refer to as amino silanes), known ones can be used, and examples thereof include monoaminosilanes, diaminosilanes, triaminosilanes, trialkoxysilanes, each trialkoxysilane having a trialkoxysilyl group at an end thereof, dialkoxysilanes, each dialkoxysilane having a dialkoxysilyl group at an end thereof, and the like. For the (C) amino-functional organosiloxane of the first embodiment, the use of polyorganosiloxane obtained by hydrolyzing and condensing amino group-substituted dialkoxysilane having a dialkoxysilyl structure at an end thereof and having, a primary and/or a secondary amino group in its molecule, is particularly preferable.

The amino-functional organosiloxane preferable to be used as the component (C) is linear polydiorganosiloxane represented by the general formula:

[Chemical Formula 9]

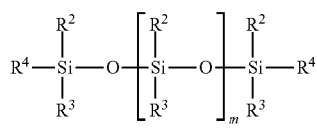
(2)

or cyclic polydiorganosiloxane represented by the following general formula.

[Chemical Formula 10]

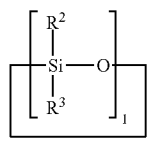
(3)

In these formulas, $R^2$s are the same or different and each represents an alkyl group. Examples thereof include a methyl group, an ethyl group, a propyl group, a butyl group, a hexyl group and the like, in which the methyl group is preferable. $R^3$s are aminopropyl groups represented by a formula: $-(CH_2)_3NH_2$, or N-(β-aminoethyl)-aminopropyl groups represented by a formula: $-(CH_2)_3NH-(CH_2)_2NH_2$. $R^4$s represent hydroxyl groups or alkoxyl groups. As the alkoxyl group, there can be mentioned a methoxy group, an ethoxy group, a propoxy group, a butoxy group, and the like, in which the methoxy group is preferable in view of the fast curing property. Further, m is an integer of 0 (zero) to 30, and l is an integer of 3 to 30.

The (C) amino-functional organosiloxane described above is blended in an amount of 0.05 to 25 parts by weight, preferably 0.1 to 15 parts by weight, and more preferably 0.2 to 10 parts by weight per 100 parts by weight of the aforementioned (A) reactive silicon group-containing polymer. When the blended amount of the (C) amino-functional organosiloxane is less than 0.05 part by weight, a good initial adhesiveness cannot be attained, and the water resistance is insufficient, so that the adhesiveness decreases largely under water immersion condition. When the blended amount of the (C) amino-functional organosiloxane is more than 25 parts by weight, a liquid separation may occur in a container during the storage, or the adhesiveness may be lowered due to the water immersion. Further, also in this case, an uncured composition may become cloudy, or the component may be oozed out from the surface after the cure is completed, which is unfavorable.

Second and Third Embodiments

A room temperature curable silicon group-containing polymer composition according to a second embodiment of the present invention comprises (A) a reactive silicon group-containing polymer that is a mixture in which (A1) a first reactive silicon group-containing polymer and (A2) a second reactive silicon group-containing polymer are blended in a weight ratio of 1:9 to 9:1, and based on 100 parts by weight of the (A) reactive silicon group-containing polymer, (B) 0.01 to 10 parts by weight of a curing catalyst, and (C) 0.05 to 25 parts by weight of amino-functional organosiloxane, respectively.

A room temperature curable silicon group-containing polymer composition according to a third embodiment of the present invention comprises the (A) reactive silicon group-containing polymer that is a mixture in which the (A1) first reactive silicon group-containing polymer and the (A2) second reactive silicon group-containing polymer are blended in a weight ratio of 1:9 to 9:1, and based on 100 parts by weight of the (A) reactive silicon group-containing polymer, (B) 0.01 to 10 parts by weight of a curing catalyst, and (C1) 0.05 to 25 parts by weight of amino group-substituted alkoxysilane, respectively.

In the second and third embodiments, the (A1) first reactive silicon group-containing polymer is obtained through a urethane reaction between (a1) polyoxypropylene polyol whose viscosity is 500 mPa·s to 50,000 mPa·s at 25° C. and (b1) γ-isocyanate propyltrialkoxysilane.

As the (a1) polyoxypropylene polyol being one component for preparing the (A1) first reactive silicon group-containing polymer, the one same as the (a1) polyoxypropylene polyol cited as the one component for preparing the reactive silicon group-containing polymer being the component (A) in the aforementioned first embodiment can be used. Further, as the (b1) γ-isocyanate propyltrialkoxysilane being the other component, γ-isocyanate propyltrimethoxysilane is preferably used.

Blending ratio of the both components, procedures and conditions for the urethane reaction, determinations of reaction end points, and the like can also be decided in the same manner as in the preparation of the (A) reactive silicon group-containing polymer in the first embodiment.

Thus obtained (A1) first reactive silicon group-containing polymer is represented by the general formula:

[Chemical Formula 11]

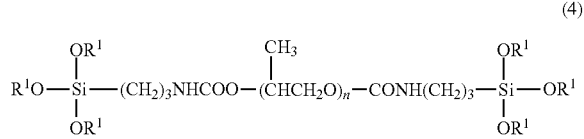
(4)

(wherein $R^1$s are the same or different and each represents an alkyl group having 1 to 4 carbons. n is a positive integer which satisfies 86<n<344), in which a main chain is substantially composed of polyoxypropylene, a trialkoxysilyl group is contained as a reactive silicon group-containing group, and a methylene bond and one urethane bond are located at chemically bonded portions between the trialkoxysilyl group and the main chains. Especially preferably, all of the $R^1$s are methyl groups. The reactive silicon group-containing polymer is obtained by using γ-isocyanate propyltrimethoxysilane as the γ-isocyanate propyltrialkoxysilane being the component (b1), and is good in the fast curing property and excellent in the storage stability.

In the second and third embodiments, the (A2) second reactive silicon group-containing polymer is obtained through a urethane reaction between (a2) hydroxypolyoxypropylene having a hydroxyl group at one end thereof whose viscosity is 100 mPa·s to 50,000 mPa·s at 25° C. and (b1) γ-isocyanate propyltrialkoxysilane.

The (a2) hydroxypolyoxypropylene having a hydroxyl group at one end thereof being one component for preparing the (A2) second reactive silicon group-containing polymer is a hydroxyl compound that contains a plurality of oxypropylene units, and a hydroxyl group only at one (side) end of its molecule. The one having a viscosity of 100 mPa·s to 50,000 mPa·s at 25° C. is used. As the (b1) γ-isocyanate propyltrialkoxysilane being the other component, γ-isocyanate propyltrimethoxysilane is preferably used.

The blending ratio of the (a2) hydroxypolyoxypropylene having a hydroxyl group at one end thereof and the (b1) γ-isocyanate propyltrialkoxysilane is not limited in particular, and to blend both of them so that a ratio of the number of isocyanate groups (NCO) of the γ-isocyanate propyltrialkoxysilane being the component (b1) to the number of hydroxyl groups (OH) of the (a2) hydroxypolyoxypropylene having a hydroxyl group at one end thereof. (NCO/OH ratio) falls into a range of 0.6 to 1.2, preferably, 0.8 to 1.0. When the NCO/OH ratio becomes smaller than 0.6, the fast curing property of the obtained silicon group-containing polymer is lowered, and the water resistance is lowered due to the residue of the hydroxyl group, which is unfavorable. When the NCO/OH ratio becomes larger than 1.2, the storage stability is lowered due to the residue of the γ-isocyanate propyltrialkoxysilane being the component (b1). When both of them are blended so that the NCO/OH ratio falls into a range of 0.8 to 1.0, it is possible to obtain the room temperature curable silicon group-containing polymer composition which is quite excellent in the fast curing property, the storage stability, the water resistance, and the like.

For carrying out the urethane reaction, each of a predetermined amount of the (a2) hydroxypolyoxypropylene having a hydroxyl group at one end thereof and (b1) γ-isocyanate propyltrialkoxysilane is blended, and stirred while being heated at, for example, 60° C. to 100° C. for several hours. This reaction is preferably carried out in an inert gas such as nitrogen gas. Further, in order to catalyze the reaction, a very small amount of urethane polymerization catalyst such as dibutyltin dilaurylate can be added in the beginning or in the middle of the urethane reaction. A point where a value approximate to the theoretical amount of NCO or the theoretical amount of hydroxyl value calculated based on the NCO/OH ratio is attained is made to be an end point of the reaction, to thereby determine the completion of the reaction.

Thus obtained (A2) second reactive silicon group-containing polymer has a main chain being, substantially composed of polyoxypropylene, and a trialkoxysilyl group as a reactive silicon group-containing group only at one side end of the main chain, in which a methylene bond and one urethane bond are located at chemically bonded portions between the trialkoxysilyl group and the main chains.

Specifically, the (A2) second reactive silicon group-containing polymer is represented by the general formula:

[Chemical Formula 12]

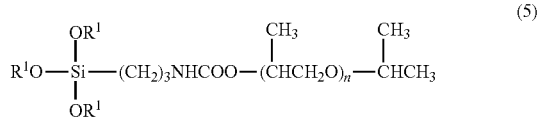

(5)

(wherein $R^1$s are the same or different and each represents an alkyl group having 1 to 4 carbons. n is a positive integer which satisfies 86<n<344). Especially preferably, all of the $R^1$s are methyl groups. The reactive silicon group-containing polymer is obtained by using γ-isocyanate propyltrimethoxysilane as the γ-isocyanate propyltrialkoxysilane being the component (b1), and is good in the fast curing property and excellent in the storage stability.

The (A1) first reactive silicon group-containing polymer and the (A2) second reactive silicon group-containing polymer are preferably blended in a weight ratio of 1:9 to 9:1. If the blending ratio is out of the above range, it is impossible to obtain the composition with no residual tack on the surface of the cured product and with sufficient mechanical strength at low modulus.

In order to catalyze the cure, the (B) curing catalyst is blended with each of the room temperature curable silicon group-containing polymer compositions in the second and third embodiments. For the curing catalyst, the one same as that used in the first embodiment can be used. The blending ratio of the (B) curing catalyst is 0.01 to 10 parts by weight, preferably 0.05 to 8.0 parts by weight, and more preferably 0.1 to 5.0 parts by weight with respect to 100 parts by weight of the (A) reactive silicon group-containing polymer that is a mixture of the (A1) first reactive silicon group-containing polymer and the (A2) second reactive silicon group-containing polymer.

With the room temperature curable silicon group-containing polymer composition of the second embodiment, (C) amino-functional organosiloxane is blended together with the aforementioned (B) curing catalyst. As the (C) amino-functional organosiloxane, the one same as the amino-functional organosiloxane being the component (C) mentioned in the first embodiment can be used. A particularly preferable amino-functional organosiloxane is linear polydiorganosiloxane represented by the aforementioned general formula (2), or cyclic polydiorganosiloxane represented by the general formula (3), same as the first embodiment.

The (C) amino-functional organosiloxane described above is blended in an amount of 0.05 to 25 parts by weight, preferably 0.5 to 10 parts by weight, and more preferably 1 to 5 parts by weight per 100 parts by weight of the mixture of the (A1) first reactive silicon group-containing polymer and the (A2) second reactive silicon group-containing polymer. When the blended amount of the amino-functional organosiloxane being the component (C) is less than 0.05 part by weight, a good initial adhesiveness cannot be attained, in which especially an expression of adhesiveness under a low temperature is decreased. When the blended amount is more than 25 parts by weight, a liquid separation may occur in a container during the storage.

With the room temperature curable silicon group-containing polymer composition of the third embodiment, (C1) amino group-substituted alkoxysilane (hereinafter, also refer to as amino silanes) is blended together with the aforementioned (B) curing catalyst. For the amino silanes, known ones can be used, and examples thereof include monoaminosilanes, diaminosilanes, triaminosilanes, trialkoxysilanes, each trialkoxysilane having a trialkoxysilyl group at an end thereof, complex reactive aminosilanes, and the like. The monoaminosilanes can be divided broadly into silane containing a primary amino group, silane containing a secondary amino group, silane containing a tertiary amino group, and quaternary ammonium salt. For the diaminosilanes, a compound containing each one of a primary amino group and a secondary amino group in its molecule, a compound containing two secondary amino groups in its molecule, and the like, can be cited as examples. For the trialkoxyaminosilanes, silane having alkoxysilyl structures at both ends thereof and containing a secondary amino group in its molecule, and the like, can be mentioned as examples.

The following can be mentioned as an example of a preferable amino group-substituted alkoxysilane being the component (C). A compound among the monoaminosilanes and the diaminosilanes in which the silane contains the primary amino group at an end of its molecule, and the alkoxysilyl group is a trimethoxysilyl group, a methyldimethoxysilyl group, or a triethoxysilyl group, is preferable since it exhibits the fast curing property. Particularly preferable amino group-substituted alkoxysilanes are N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-(β-aminoethyl)-γ-aminopropylmethyldimethoxysilane, and γ-aminopropylmethyldimethoxysilane. These compounds have advantages in providing not only the fast curing property but also excellent storage stability.

The (C1) amino group-substituted organosiloxane is blended in an amount of 0.05 to 25 parts by weight, preferably 0.5 to 10 parts by weight, and more preferably 1 to 5 parts by weight per 100 parts by weight of the mixture of the (A1) first reactive silicon group-containing polymer and the (A2) second reactive silicon group-containing polymer. When the blended amount of the amino group-substituted alkoxysilane being the component (C1) is less than 0.05 part by weight, a good initial adhesiveness cannot be attained, in which especially an expression of adhesiveness under a low temperature is decreased. When the blended amount is more than 25 parts by weight, a liquid separation may occur in a container during the storage.

Fourth to Sixth Embodiments

A room temperature curable silicon group-containing polymer composition of a fourth embodiment of the present invention comprises, as a component (A), a reactive silicon group-containing polymer having a main chain being substantially composed of polyoxypropylene, and having a reactive silicon-containing group represented by a formula:

[Chemical Formula 13]

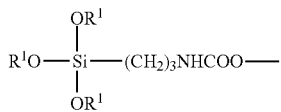

(1)

(wherein $R^1$s are the same or different and each represents an alkyl group having 1 to 4 carbons) at an end of the main chain, and it further comprises (B) a curing catalyst, (C) amino-functional organosiloxane, and (D) an inorganic filler being surface-treated with glycol that is liquid at room temperature, respectively.

A room temperature curable silicon group-containing polymer composition of a fifth embodiment of the present invention comprises, as a component (A), a reactive silicon group-containing polymer same as that of the fourth embodiment, and further comprises (B) a curing catalyst, (C1) amino group-substituted alkoxysilane, and (D) an inorganic filler being surface-treated with glycol that is liquid at room temperature, respectively.

A room temperature curable silicon group-containing polymer composition of a sixth embodiment of the present invention comprises (A) a polyoxyalkylene polymer having a hydrolyzable silicon group, and based on 100 parts by weight thereof, (B) 0.01 to 10 parts by weight of a curing catalyst, (C2) 0.05 to 25 parts by weight of amino group-substituted alkoxysilane and/or its hydrolyzed and condensed product, and (D) 1 to 500 parts by weight of an inorganic filler being surface-treated with glycol that is liquid at room temperature, respectively.

In the fourth and fifth embodiments, same as the first embodiment, the reactive silicon group-containing polymer being the component (A) is obtained through a urethane reaction between (a1) polyoxypropylene polyol whose number average molecular weight is 500 to 50,000 and (a2) γ-isocyanate propyltrialkoxysilane.

In the fourth and fifth embodiments, for the (a1) polyoxypropylene polyol and the (a2) γ-isocyanate propyltrialkoxysilane being the both components for preparing the reactive silicon group-containing polymer being the component (A), the ones same as those cited in the first embodiment can be used. The (A) reactive silicon group-containing polymers of the fourth and fifth embodiments can be obtained by using these components and making them react in the same manner as in the first embodiment.

The obtained (A) reactive silicon group-containing polymer has a main chain being substantially composed of polyoxypropylene, and a trialkoxysilyl group as a reactive silicon group-containing group, in which a methylene bond and one urethane bond are located at chemically bonded portions between the trialkoxysilyl group and the main chains.

Specifically, the reactive silicon group-containing polymer being the component (A) in the fourth and fifth embodiments is represented by the general formula:

[Chemical Formula 14]

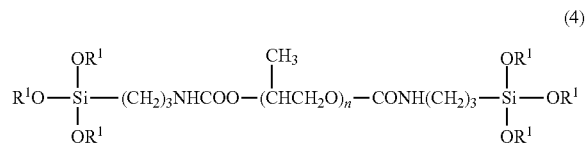

(4)

(wherein $R^1$s are the same or different and each represents an alkyl group having 1 to 4 carbons. n is a positive integer which satisfies 86<n<344). Especially preferably, all of the $R^1$s are methyl groups. The reactive silicon group-containing polymer is obtained by using γ-isocyanate propyltrimethoxysilane as the γ-isocyanate propyltrialkoxysilane being the component (a2), and is good in the fast curing property and excellent in the storage stability.

The polyoxyalkylene polymer being the component (A) used in the sixth embodiment is a polyoxyalkylene polymer (A3) having a hydrolyzable silicon group represented by the later-described formula (6), and/or a polyoxyalkylene polymer (A4) having a hydrolyzable silicon group represented by the later-described formula (11). As will be described later, they are preferable to be produced by using a polyoxyalkylene polymer having a functional group as a raw material (hereinafter, refer to as a raw material polyoxyalkylene polymer) and by introducing, into a part or all of its end, a hydrolyzable silicon group via an organic group. For instance, the ones described in JP-A 03-047825, (KOKAI), JP-A 03-072527 (KOKAI), and in JP-A 03-079627 (KOKAI) can be cited.

For the raw material polyoxyalkylene polymers in the polyoxyalkylene polymers (A3) and (A4), the ones terminated with hydroxyl groups produced by reacting cyclic ethers or the like in the presence of catalysts and initiators, are preferable. As the initiator, a hydroxy compound having at least one hydroxyl group and the like can be used. As the cyclic ether, ethylene oxide, propylene oxide, butylene oxide, hexylene oxide, tetrahydrofuran, or the like can be cited. The cyclic ethers may be used singly, or two or more of them may be used in combination. Examples of the catalyst include alkali metal catalysts such as a potassium-based compound and a cesium-based compound, a metal composite cyanogen compound complex catalyst, a metal porphyrin catalyst, and the like.

In the sixth embodiment, as the raw material polyoxyalkylene polymer, a high molecular weight polyoxyalkylene polymer having a molecular weight of 500 to 50,000 is preferable to be used. Further, the polyoxyalkylene polymer having a molecular weight of 1,000 to 30,000 is preferable. Therefore, the use of polyoxyalkylene polymer whose molecular weight is increased through a reaction between a polyoxyalkylene polymer with relatively low molecular weight produced by using an alkali catalyst or the like, and a polyhalide, or the use of polyoxyalkylene polymer produced by using the metal composite cyanogen compound complex catalyst is preferable. Examples of the polyhalides include methylene chloride, monochloro bromomethane, methylene bromide, methylene iodide, 1,1-dichloro-2,2-dimethylpropane, benzal chloride, bis (chloromethyl)benzene, tris (chloromethyl)benzene, bis (chloromethyl)ether, bis(chloromethyl) thioether, bis (chloromethyl) formal, tetrachlorethylene, trichloroethylene, 1,1-dichloroethylene, 1,2-dichloroethylene, and 1,2-dibromoethylene, and the like. Among all, the methylene chloride and the monochloro bromomethane are particularly preferable.

For the raw material polyoxyalkylene polymer, a polyoxyalkylene polymer having a ratio of weight average molecular weight (Mw)/number average molecular weight (Mn) (hereinafter, refer to as Mw/Mn) especially of 1.7 or lower is preferable to be used. Further, the Mw/Mn is more preferably 1.6 or lower, and is particularly preferably 1.5 or lower.

The polyoxyalkylene polymers (A3) and (A4) are obtained by modifying end groups of such polyoxyalkylene polymers into hydrolyzable silicon groups. When comparing the raw material polyoxyalkylene polymers with the same number average molecular weight (Mn), the one with smaller Mw/Mn exhibits lower viscosity and better workability, and when the polyoxyalkylene polymer (A3) or (A4) having a hydrolyzable group obtained by using the polymer as a raw material is cured, the elongation of the cured product becomes large and the strength becomes high, even though the modulus of elasticity is the same.

Among such polyoxyalkylene polymers, the one obtained by polymerizing the cyclic ether using the metal composite cyanogen compound complex as a catalyst in the presence of initiator is especially preferable. The one in which the end of such a polyoxyalkylene polymer is modified into the hydrolyzable silicon group is the most preferable.

As the metal composite cyanogen compound complex, a complex containing zinc hexacyanocobaltate as a main component, in which a complex of ether and/or alcohol are preferred. As the composition thereof, the one described in JP-B 46-027250 (KOKOKU) can be used. As the ether, ethylene glycol dimethyl ether (glyme), diethylene glycol dimethyl ether (diglyme) and the like are preferred, in which the glyme is particularly preferred from the viewpoint of handling at the time of production of the complex. As the alcohol, t-butanol is preferable.

The raw material polyoxyalkylene polymer preferably has two or more of functional groups. In order to increase the flexibility as the characteristic of the cured product, the raw material polyoxyalkylene polymer preferably has 2 or 3 of functional groups. In order to obtain good adhesiveness and curing property, the raw material polyoxyalkylene polymer preferably has 3 to 8 of functional groups. Specific examples of the raw material polyoxyalkylene polymer include polyoxyethylene, polyoxypropylene, polyoxybutylene, polyoxyhexylene, and a copolymer of polyoxytetramethylene and two kinds or more of cyclic ethers. Particularly preferred raw material polyoxyalkylene polymers are divalent to hexavalent polyoxypropylene polyols, especially, polyoxypropylene diol and polyoxypropylene triol. Further, in the case of using for the later-described method (a) or (d), an olefin-terminated polyoxyalkylene polymer such as allyl-terminated polyoxypropylene monool can be used.

The polyoxyalkylene polymer (A3) has hydrolyzable silicon groups represented by the following formula (6) at an end or at the side chain of the molecular chain.

[Chemical Formula 15]

$$-SiX_2R^6 \tag{6}$$

In the formula (6), $R^6$ represents a substituted or unsubstituted monovalent organic group having 1 to 20 carbons, which is preferably an alkyl group having 8 carbons or less, a phenyl group, or a fluoroalkyl group and is particularly preferably a methyl group, an ethyl group, a propyl group, a butyl group, a hexyl group, a cyclohexyl group, a phenyl group, or the like. X represents a hydroxyl group or a hydrolyzable group. For the hydrolyzable group, for instance, a halogen atom, an alkoxy group, an acyloxy group, an alkenyloxy group, a carbamoyl group, an amino group, an aminoxy group, a ketoximato group, and the like can be cited.

In the hydrolyzable group having carbon atoms, the number of carbons is preferably 6 or smaller, and particularly preferably 4 or smaller. As an example of a preferred X, mention may be made of an alkoxy group or an alkenyloxy group each having 4 carbons or less, particularly, a methoxy group, an ethoxy group, a propoxy group or a propenyloxy group. Specifically, the hydrolyzable silicon group represented by the formula (6) preferably takes a structure having an alkyldialkoxysilyl group including an alkoxy group having 4 carbons or less. A structure having a dimethoxymethylsilyl group is the most preferable.

The number of hydrolyzable silicon groups represented by the formula (6) included in the polyoxyalkylene polymer (A3) is preferably 1.2 or larger, more preferably 2 or larger, further preferably 2 to 8, and particularly preferably 2 to 6. The hydrolyzable silicon groups represented by the formula (6) are introduced into the raw material polyoxyalkylene polymer via organic groups. Specifically, the polyoxyalkylene polymer (A3) preferably has groups represented by a formula (7).

[Chemical Formula 16]

$$-R^7-SiX_2R^8 \tag{7}$$

In the formula (7), $R^7$ is a divalent organic group, and $R^6$ and X are the same as defined above. An example of the preferred divalent organic group includes a substituted or unsubstituted divalent hydrocarbon group having 1 to 20 carbons, for instance. A divalent hydrocarbon group having 1 to 17 carbons is preferable, in which an alkylene group having 8 carbons or less or a phenylene group is more preferable, and a methylene group, an ethylene group, a propylene group, a trimethylene group, a tetramethylene group, a hexamethylene group, or the like is particularly preferable.

A method for introducing the hydrolyzable silicon group into the raw material polyoxyalkylene polymer is not limited in particular, and the following methods (a) to (d) can be adopted, for instance.

(a) A method of introducing an olefin group into the terminal of the polyoxyalkylene polymer having a hydroxyl group, followed by reacting with silicon hydride compound represented by a formula (8).

[Chemical Formula 17]

$$HSiX_2R^6 \qquad (8)$$

In the formula (8), $R^6$ and X are the same as defined above. As the method of introducing olefin groups, a method is mentioned in which the compound having an unsaturated group and a functional group is reacted with a terminal hydroxyl group of the polyoxyalkylene polymer having a hydroxyl group, followed by bonding by an ether bond, an ester bond, a urethane bond, a carbonate bond, or the like. A method can also be used in which an olefin group is introduced into the side chain of the raw material polyoxyalkylene polymer, by adding an olefin group-containing epoxy compound such as allylglycidyl ether, and copolymerizing them when polymerizing cyclic ether. Further, when reacting a silicon hydride compound, a catalyst such as a platinum catalyst, a rhodium catalyst, a cobalt catalyst, a palladium catalyst, a nickel catalyst or the like may be used. A platinum catalyst such as chloroplatinic acid, platinum metal, platinum chloride, platinum olefin complex, and the like may be preferred. The reaction is conducted at a temperature of 30° C. to 150° C., preferably 60° C. to 120° C. for several hours.

(b) A method of reacting compound represented by a formula (9) to the terminal of the polyoxyalkylene polymer having a hydroxyl group.

[Chemical Formula 18]

$$R^6\text{—}SiX_2\text{—}R^8NCO \qquad (9)$$

In the formula (9), $R^6$ and X are the same as defined above. $R^8$ represents a divalent hydrocarbon group having 1 to 17 carbons, which is preferably an alkylene group having 8 carbons or less or a phenylene group. Particularly preferred are a methylene group, an ethylene group, a propylene group, a trimethylene group, a tetramethylene group, a hexamethylene group, and the like. For the urethane reaction, a known catalyst may be used. The above reaction is conducted at a temperature of 20° C. to 200° C., preferably 50° C. to 150° C. for several hours.

(c) A method of reacting polyisocyanate compound such as tolylene diisocyanate to the terminal of the polyoxyalkylene polymer having a hydroxyl group to make isocyanate group terminal, followed by reacting W groups in the silicon compound represented by a formula (10) with the isocyanate group.

[Chemical Formula 19]

$$R^6\text{—}SiX_2\text{—}R^8W \qquad (10)$$

In the formula (10), $R^6$, $R^8$, and X are the same as defined above. W is an active hydrogen-containing group selected from a hydroxyl group, a carboxyl group, a mercapto group and an amino group (primary or secondary).

(d) A method of introducing an olefin group into the terminal of the polyoxyalkylene polymer having a hydroxyl group, followed by reacting the olefin group with mercapto group in the silicon compounds represented by the aforementioned formula (10), in which W is a mercapto group.

As the silicon compound represented by the formula (10) in which W is a mercapto group, 3-mercaptopropyl methyldimethoxysilane, 3-mercaptopropyl methyldiethoxysilane and the like may be mentioned. For the above reaction, a polymerization initiator such as a radical generator may be used, and as the case requires, it is possible to carry out the reaction by radiation or heating, without using the polymerization initiator. As the polymerization initiator, for instance, a polymerization initiator such as a peroxide type, an azo type and a redox type, a metal compound catalyst, and the like may be mentioned. Examples thereof include 2,2'-azobisisobutyronitrile, 2,2'-azobis-2-methylbutyronitrile, benzoyl peroxide, t-alkyl peroxyester, acetyl peroxide, diisopropyl peroxycarbonate, and the like may be cited. The above reaction is conducted at a temperature of 20° C. to 200° C., preferably 50° C. to 150° C. for several hours to several tens hours.

The polyoxyalkylene polymer (A4) has hydrolyzable silicon groups represented by the following formula (11) at an end or at the side chain of the molecular chain.

[Chemical Formula 20]

$$\text{—}SiX_3 \qquad (11)$$

In the formula (11), X represents a hydroxyl group or a hydrolyzable group, same as described above, and three Xs may be the same or different. For the hydrolyzable group, for instance, a halogen atom, an alkoxy group, an acyloxy group, an alkenyloxy group, a carbamoyl group, an amino group, an aminoxy group, a ketoximato group, and the like can be cited.

In the hydrolyzable group having a carbon atom, the number of carbon is preferably 6 or smaller, and preferably 4 or smaller. As an example of a preferred X, mention may be made of an alkoxy group or an alkenyloxy group each having 4 carbons or less, particularly, a methoxy group, an ethoxy group, a propoxy group or a propenyloxy group. The hydrolyzable silicon group represented by the formula (11) especially preferably takes a structure having an alkyldialkoxysilyl group including an alkoxy group having 4 carbons or less. A structure having a dimethoxymethylsilyl group is the most preferable.

A polymer having a trialkoxysilyl group is quite highly reactive, and particularly the initial curing speed is very high. Generally, in the hydrolysis reaction, it is considered that a silanol group is generated from the reaction with water (a silanol group-generating reaction represented by: —SiX+ $H_2O\rightarrow$—SiOH+HX), and generated silanol groups are condensed, or the silanol group and the hydrolyzable silicon group are condensed, to generate a siloxane bond (condensation reaction). Once a silanol group are generated, the condensation reaction progresses smoothly.

The initial reaction speed of the silanol group-generating reaction of the trialkoxysilyl group is quite high as compared with an alkyldialkoxysilyl group or a dialkylalkoxysilyl group. Therefore, the curable composition has an effect that it exhibits a sufficient strength property in a short period of time, and particularly, the time until the adhesiveness is expressed is short. Among trialkoxysilyl groups, a trialkoxysilyl group having an alkoxy group of smaller number of carbons is more preferred, since it has higher initial reaction speed of silanol group-generating reaction than a trialkoxysilyl group having an alkoxy group of higher number of carbons. A trimethoxysilyl group and a triethoxysilyl group are more preferred, and a trimethoxysilyl group is the most preferable, since it has a very high initial reaction speed of the silanol group-generating reaction.

The number of hydrolyzable silicon groups represented by the formula (11) included in the polyoxyalkylene polymer (A4) is preferably 1.2 or larger, more preferably 2 or larger, further preferably 2 to 8, and particularly preferably 2 to 6. The polyoxyalkylene polymer (A4) is obtained by introducing an unsaturated group into the terminal of the polyoxyalkylene polymer having a hydroxyl group, followed by reacting the unsaturated group with a mercapto group in the silicon compound represented by a formula (12).

[Chemical Formula 21]

$$HS-R^8-SiX_3 \quad (12)$$

In the formula (12), X is the same as defined above. The three Xs may be the same or different. $R^8$ represents a divalent hydrocarbon group having 1 to 17 carbons. As the silicon compound represented by the formula (12), 3-mercaptopropyl trimethoxysilane, 3-mercaptopropyl triethoxysilane, 3-mercaptopropyl triisopropenyloxysilane, and the like may be mentioned. The polyoxyalkylene polymer obtained through the above method has a property that the curing speed is fast, and it is excellent in workability because of its low viscosity. Further, it is also industrially effective since the raw material is easy to obtain. The details of the introduction method are the same as described in the method (d) for introducing the hydrolyzable silicon groups into the polyoxyalkylene polymer (A3).

The molecular weight of the polyoxyalkylene polymers (A3) and (A4) in the sixth embodiment of the present invention can be suitably selected depending on the application to be used, and is preferably 500 to 50,000, respectively. For a use of a sealant and the like in which flexibility is important, the molecular weight of the polyoxyalkylene polymers (A3) and (A4) is preferably 8,000 to 50,000, respectively, particularly preferably 8,000 to 25,000 from a viewpoint of workability such as discharge property, and most preferably 12,000 to 20,000. Further, for a use such as an adhesive which requires strength, the molecular weight is preferably 8,000 to 30,000, respectively, more preferably 8,000 to 20,000, and particularly preferably 12,000 to 20,000. When the molecular weight is less than 500, the cured product is fragile, and when it is more than 50,000, the workability significantly deteriorates because of viscosity.

In order to catalyze the cure, the (B) curing catalyst is blended with each of the room temperature curable silicon group-containing polymer compositions of the fourth to sixth embodiments. For the curing catalyst, known silanol condensation catalysts can be used. For instance, there can be mentioned metallic catalysts such as titanate esters such as tetrabutyl titanate and tetrapropyl titanate, organotin compounds such as dibutyltin dilaurate, dibutyltin maleate, and dibutyltin diacetate, tin carboxylates such as tin octylate, tin naphthate, tin laurate, and tin felzate, reaction products from dibutyltin oxide and phthalate ester, dibutyltin diacetylacetonate, organoaluminum compounds such as aluminum trisacetylacetonate, aluminum trisethylacetoacetate and diisopropoxyaluminum ethylacetoacetate, chelate compounds such as zirconium tetraacetylacetonate and titanium tetraacetylacetonate, lead octylate, iron naphthate, and bismuth compounds such as bismuth-tris (neodecanoate) and bismuth-tris(2-ethylhexoate).

These metallic catalysts may be used singly, or two or more of them may be used in combination. Further, known amine catalysts such as laurylamine may also be used. In the fourth to sixth embodiments, among the above curing catalysts, the use of tin carboxylates or organotin compounds such as dibutyltin dilaurate, dibutyltin maleate, dibutyltin diacetate, tin octylate, tin naphthate, tin laurate, and tin felzate, reaction products from dibutyltin oxide and phthalate ester, and tin catalysts such as dibutyltin diacetylacetonate is particularly preferable.

The curing catalyst being the component (B) is blended in an amount of 0.01 to 10 parts by weight, preferably 0.05 to 8.0 parts by weight, and more preferably 0.1 to 5.0 parts by weight per 100 parts by weight of the (A) reactive silicon group-containing polymer in the fourth and fifth embodiments. The curing catalyst is blended in an amount of 0.01 to 10 parts by weight, preferably 0.05 to 8.0 parts by weight, and more preferably 0.1 to 5.0 parts by weight per 100 parts by weight of the (A) polyoxyalkylene polymer in the sixth embodiment.

With the room temperature curable silicon group-containing polymer compositions of the fourth and sixth embodiments, amino-functional organosiloxane is blended together with the above-described (B) curing catalyst. For the amino-functional organosiloxane, the hydrolyzed and condensed product of amino group-substituted alkoxysilanes can be applied. Here, for the amino group-substituted alkoxysilanes (amino silanes), known ones can be used, and concrete examples thereof include monoaminosilanes, diaminosilanes, triaminosilanes, trialkoxysilanes, each trialkoxysilane having a trialkoxysilyl group at an end thereof, dialkoxysilanes, each dialkoxysilane having a dialkoxysilyl group at an end thereof, and the like.

For the (C) amino-functional organosiloxane, the use of polyorganosiloxane obtained by hydrolyzing and condensing amino group-substituted dialkoxysilane having a dialkoxysilyl structure at an end thereof and having a primary amino group and/or a secondary amino group (imino group) in its molecule, is preferable.

The amino-functional organosiloxane preferable to be used as the component (C) is linear polydiorganosiloxane represented by the general formula:

[Chemical Formula 22]

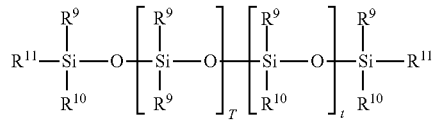

or cyclic polydiorganosiloxane represented by the following general formula.

[Chemical Formula 23]

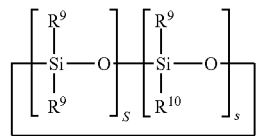

In these formulas, $R^9$s are the same or different and each represents an alkyl group. Examples thereof include a methyl group, an ethyl group, a propyl group, a butyl group, a hexyl group, and the like, in which the methyl group is preferable. $R^{10}$s are aminopropyl groups represented by a formula: $-(CH_2)_3NH_2$, or N-(β-aminoethyl)-aminopropyl groups represented by a formula: $-(CH_2)_3NH-(CH_2)_2NH_2$. $R^{11}$s represent hydroxyl groups or alkoxyl groups. As the alkoxyl group, there can be mentioned a methoxy group, an ethoxy group, a propoxy group, a butoxy group, and the like, in which the methoxy group is preferable in view of the fast curing property. T is an integer of 0 (zero) to 100, preferably, 4 to 30, t is an integer of 1 to 20, S is an integer of 0 (zero) to 50, and s is an integer of 1 to 50. Specifically, the amino-functional organosiloxane being preferable as the component (C) can include a dialkylsiloxy unit.

The (C) amino-functional organosiloxane described above is blended in an amount of 0.05 to 25 parts by weight, preferably 0.5 to 10 parts by weight, and more preferably 1 to 5 parts by weight per 100 parts by weight of either the (A) reactive silicon group-containing polymer used in the fourth embodiment or the (A) polyoxyalkylene polymer used in the sixth embodiment. When the blended amount of the (C) amino-functional organosiloxane is less than 0.05 part by weight, a good initial adhesiveness cannot be attained, in which especially an expression of adhesiveness under a low temperature is decreased. When the blended amount is more than 25 parts by weight, a liquid separation may occur in a container during the storage.

In the room temperature curable silicon group-containing polymer composition of the fifth embodiment, (C1) amino group-substituted alkoxysilane (amino silanes) is blended together with the aforementioned (B) curing catalyst. Also in the sixth embodiment, the (C1) amino silanes can be blended instead of the above-described (C) amino-functional organosiloxane. For the amino silanes, known ones can be used, and concrete examples thereof include monoaminosilanes, diaminosilanes, triaminosilanes, trialkoxysilanes, each trialkoxysilane having a trialkoxysilyl group at an end thereof, complex reactive aminosilanes, and the like. The monoaminosilanes can be divided into silane containing a primary amino group, silane containing a secondary amino group, silane containing a tertiary amino group, and quaternary ammonium salt. For the diaminosilanes, a compound containing each one of a primary amino group and a secondary amino group in its molecule, a compound containing two secondary amino groups in its molecule, and the like, can be cited as examples. For the trialkoxysilanes having trialkoxysilyl groups at ends thereof, silane having alkoxysilyl structures at both ends thereof and containing a secondary amino group in its molecule, and the like can be mentioned as examples.

The following can be mentioned as an example of a preferable amino-substituted alkoxysilane being the component (C). A compound among the monoaminosilanes and the diaminosilanes in which the silane contains the primary amino group at an end of its molecule, and the alkoxysilyl group is a trimethoxysilyl group, a methyldimethoxysilyl group, or a triethoxysilyl group, is preferable since it exhibits the fast curing property. The most preferable amino group-substituted alkoxysilanes are N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-(β-aminoethyl)-γ-aminopropylmethyldimethoxysilane, and γ-aminopropylmethyldimethoxysilane. These compounds have advantages in providing not only the fast curing property but also the excellent storage stability.

In the fifth embodiment, it is also possible to blend alkoxysilane represented by the general formula: $(R^{12}O)_{3-n}R^{13}{}_nSi\text{—}R^{14}$, as the amino group-substituted alkoxysilane being the component (C1).

In the formula, $R^{12}$ represents the same or different alkyl group. Examples thereof include a methyl group, an ethyl group, a propyl group, a butyl group, a hexyl group, and the like, in which the methyl group is preferable. $R^{13}$ also represents the same or different alkyl group. Examples thereof include a methyl group, an ethyl group, a propyl group, a butyl group, a hexyl group, and the like, in which the methyl group is preferable. n represents an integer of 0 (zero) to 2.

$R^{14}$ represents an amino group-substituted alkyl group having a branch represented by the general formula: $\text{—}(CH_2)_p\text{—}CHR^{15}\text{—}(CH_2)_q\text{—}NH_2$ or the general formula: $\text{—}(CH_2)_p\text{—}C(R^{15})_2\text{—}(CH_2)_q\text{—}NH_2$. Here, $R^{15}$ represents an alkyl group having 1 to 4 carbons. A methyl group or an ethyl group is preferable, in which the methyl group is more preferable. p and q respectively represent an integer of 1 to 8, and q is preferably 1. However, p+q is an integer of 9 or smaller.

What is particularly preferable as such $R^{14}$ is a 4-amino-3,3-dimethylbutyl group represented by the formula: $\text{—}(CH_2)_2C(CH_3)_2CH_2NH_2$, or a 4-amino-3-methylbutyl group represented by the formula: $\text{—}(CH_2)_2CH(CH_3)CH_2NH_2$.

These (C1) amino group-substituted alkoxysilanes are blended in an amount of 0.05 to 25 parts by weight, preferably 0.5 to 10 parts by weight, and more preferably 1 to 5 parts by weight per 100 parts by weight of either the (A) reactive silicon group-containing polymer composition used in the fifth embodiment or the (A) polyoxyalkylene polymer used in the sixth embodiment. When the blended amount of the amino group-substituted alkoxysilane being the component (C1) is less than 0.05 part by weight, a good initial adhesiveness cannot be attained, in which especially an expression of adhesiveness under a low temperature is decreased. When the blended amount is more than 25 parts by weight, a liquid separation may occur in a container during the storage.

The component (D) used in the fourth to sixth embodiments of the present invention has an effect of suppressing the residual tack on the surface of the cured product to thereby eliminate the viscosity, by suppressing a phenomenon that the component (A) or a cross-linking agent is separated in the upper portion of the composition due to the separation of uncured product during the storage, but, the component (D) does not adversely effect the workability as typified by flowability and discharge property.

As such a component (D), an inorganic filler being surface-treated with glycol that is liquid at room temperature is used. For the inorganic filler, reinforcing filler having an average particle diameter of 0.1 μm to 50 μm, preferably 0.1 μm to 30 μm is used. For example, there can be mentioned pulverized silica, heavy calcium carbonate, zinc carbonate, titanium dioxide, aluminum hydroxide, and the like. For the glycol which treats the surface of such an inorganic filler, ethylene glycol, propylene glycol, diethylene glycol, 1,4-butanediol, or the like can be cited. In view of the efficiency for suppressing the residual tack on the surface of the cured product, as the component (D), heavy calcium carbonate which is surface-treated with diethylene glycol is used most preferably. The component (D) is blended in an amount of 1 to 500 parts by weight, preferably 5 to 450 parts by weight, and further preferably 10 to 350 parts by weight per 100 parts by weight of either the (A) reactive silicon group-containing polymer used in the fourth and fifth embodiments or the (A) polyoxyalkylene polymer used in the sixth embodiment.

In order to improve the adhesiveness and the storage stability, it is possible to further blend silane coupling agents such as vinyl trimethoxysilane and γ-glycidoxypropyltrimethoxysilane with the room temperature curable silicon group-containing polymer compositions of the first to sixth embodiments of the present invention. Further, if necessary, an epoxy resin and its curing agent, a filler, a plasticizer, a viscosity improver, other additives, and the like can be appropriately blended.

As the epoxy resins, conventionally known ones can be used. For instance, there can be mentioned bisphenol A type epoxy resin, bisphenol F type epoxy resin, fire-resistant type epoxy resin such as glycidyl ether of tetrabromobisphenol A, novolak type epoxy resin, hydrogenated bisphenol A type epoxy resin, glycidyl ether type epoxy resin of bisphenol A-propylene oxide adduct, diglycidylester phthalate type epoxy resin such as diglycidyl-p-oxybenzoate, diglycidylester phthalate, diglycidylester tetrahydrophthalate or diglycidylester hexahydrophthalate, m-aminophenol type epoxy resin, diaminodiphenylmethane type epoxy resin, urethane modified epoxy resin, various alicyclic epoxy resins, N,N-diglycidylaniline, N,N-diglycidyl-o-toluidine, triglycidyl isocyanurate, polyalkylene glycol diglycidyl ether or glycidyl ether of polyvalent alcohol such as glycerol, hydantoin type epoxy resin, and an epoxy compound of an unsaturated polymer such as a petroleum resin. Among the above epoxy resins, the one including at least two epoxy groups in its molecule is preferable in view of high reactivity at the time of curing, and easiness of creating a three-dimensional network in the cured product. As preferable epoxy resins, the bisphenol A type epoxy resin, the bisphenol F type epoxy resin, the novolak type epoxy resin, and the diglycidylester phthalate type epoxy resin can be mentioned.

As a curing agent of the epoxy resin, for example, amines such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, and 2,4,6-tris(dimethylaminomethyl)phenol, tertiary amine salts, polyamide resins, latent curing agents such as ketimines, aldimines, and enamines, imidazoles, dicyandiamides, boron trifluoride complex compounds, carboxylic anhydrides such as phthalic anhydride, hexahydrophthalic anhydride, tetrahydrophthalic anhydride, endomethylenetetrahydrophthalic anhydride, dodecenyl succinic anhydride, pyromellitic anhydride, and chlorendic anhydride, alcohols, phenols, and carboxylic acids can be cited.

As the fillers, conventionally known ones can be used, and examples thereof include reinforcing fillers such as fumed silica, precipitated silica, silicic acid anhydride, silicic acid hydrate, and carbon black, non-reinforcing fillers such as calcium carbonate, magnesium carbonate, diatomaceous earth, burned clay, clay, talc, titanium oxide, bentonite, organic bentonite, ferric oxide, zinc oxide, active zinc flower, and glass balloon, and fiber fillers such as asbestos, a glass fiber, and a glass filament.

Examples of the plasticizer include, for instance, phthalate esters such as dioctyl phthalate, dibutyl phthalate, and butylbenzyl phthalate, aliphatic carboxylic acid esters such as dioctyl adipate, isodecyl succinate, dibutyl sebacate, and butyl oleate, glycol esters such as pentaerythritol ester, ester phosphates such as trioctyl phosphate and tricresyl phosphate, epoxy plasticizers such as epoxylated soybean oil, and benzylepoxystearic acid, chlorinated paraffins, and the like, in which the above plasticizers may be used singly, or two or more of them may be used by mixing them. Further, polyoxypropylene monool, polyoxypropylene diol, and terminal modified products thereof, and the like can also be applied. As the terminal modified product, for example, a compound in which the terminal hydroxyl group is modified into an alkoxyl group or an alkenyloxy group, a compound terminated with a hydrocarbon group via a urethane bond, an ester bond, a urea bond, or a carbonate bond, and the like can be cited.

For the viscosity improver, there can be mentioned a gelling agent such as hydrogenated castor oil, dibenzyliden sorbitol, and tribenzyliden sorbitol, and fatty acid amide such as amide wax. For the other additives, for example, a pigment, various age resisters, an ultraviolet absorbent, and the like can be cited.

The blending ratio of the aforementioned components is not limited in particular, and it is preferable to blend, based on 100 parts by weight of the silicon group-containing polymer composition, 1 to 100 parts by weight (preferably, 10 to 100 parts by weight) of the epoxy resin, 0.1 to 200 parts by weight of the filler, 1 to 50 parts by weight of the plasticizer, and 0.1 to 10 parts by weight of the viscosity improver, in which 1 to 200 parts by weight (preferably 50 to 100 parts by weight) of the curing agent of the epoxy resin is preferably blended per 100 parts by weight of the epoxy resin.

Hereinafter, the present invention will be specifically explained by citing examples, but, it is not limited to the examples described below. Note that the terms "part(s)" and "%", in the examples represent "part(s) by weight" and "wt %", respectively. All physical values such as viscosity are values measured at 25° C. and a relative humidity (RH) of 50%.

Synthesis Example 1

2,000 parts of polyoxypropylene diol (PREMINOL: manufactured by Asahi Glass Co., Ltd.) having a number average molecular weight (hereinafter, abbreviated as Mn) of 16,000 was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 44.8 parts of γ-isocyanate propyltrimethoxysilane (trade name, Silquest A-link35: manufactured by GE Toshiba Silicone Co., Ltd.) was put therein so that the NCO/OH ratio became 1.0, and after the temperature was raised under the nitrogen gas flow, they were kept stirred for 8 hours at a temperature of 60° C. to 70° C. When the NCO content ratio was measured, it was decreased to 0.05% (theoretical value 0%), so that the content was taken out after being cooled. A reactive silicon group-containing polypropylene polymer (A) was thus obtained. The viscosity of the polymer was 21,000 mPa·s.

Synthesis Example 2

Polyoxypropylene diol (trade name, PREMINOL: manufactured by Asahi Glass Co., Ltd.) having Mn of 10,000 was used in place of the polyoxypropylene diol used in the synthesis example 1, 82.0 parts of γ-isocyanate propyltrimethoxysilane (trade name, Silquest A-link35) was added thereto so that the NCO/OH ratio became 1.0, and by making them react in the same manner as in the synthesis example 1, a reactive silicon group-containing polypropylene polymer (B) with the NCO content ratio of 0.06% and the viscosity of 7,000 mPa·s was obtained.

Synthesis Example 3

Using the same device as in the synthesis example 1, after dehydrating polyoxypropylene diol same as that used in the synthesis example 2, 6.7 parts of 2,4-toluene diisocyanate was put therein at 50° C. so that the NCO/OH ratio became 0.48. Subsequently, they were reacted for 12 hours while being stirred under the nitrogen gas flow at a temperature of 70° C. to 80° C., for a synthesis of an isocyanate-terminated urethane prepolymer.

Next, after the prepolymer was once cooled to 40° C., 28 parts of γ-isocyanate propyltrimethoxysilane (trade name, Silquest A-link35) was added thereto, and by making them react for 20 hours while stirring, a reactive silicon group-containing polypropylene polymer (C) with the NCO content ratio of 0.1% and the viscosity of 32,500 mPa·s was obtained.

Synthesis Example 4

To a mixture of 400 parts (0.1 mol) of polyoxypropylene diol (trade name, PREMINOL: manufactured by Asahi Glass Co., Ltd.) having Mn of 4,000 and 36 parts (0.144 mol) of 4,4'-diphenylmethanediisocyanate being prepared to indicate the NCO/OH ratio of 1.4, 60 ppm of dibutyltin dilaurate as a reactive catalyst and 20 ppm of benzoyl chloride as a retardant were added respectively, and by stirring them for about 4 hours at 60° C. to 70° C., the NCO content was decreased to nearly 0.8 wt %.

Next, to the isocyanate-terminated polyurethane prepolymer, 21.4 parts (0.084 mol) of N-phenyl-γ-aminopropyltrimethoxysilane (trade name, Silquest Y-9669: manufactured by GE Toshiba Silicone Co., Ltd.) was added, and they were reacted at a temperature of 70° C. to 75° C. until the NCO content became zero. Thus, a reactive silicon group-containing polypropylene polymer (D) was obtained.

Synthesis Example 5

After the air in a 2-liter four-necked separable flask equipped with an agitator, a dropping funnel, a reflux tube, a thermometer, a nitrogen gas flow device, and a pressure reducing device was substituted with nitrogen, 900 parts of N-(β-aminoethyl)-aminopropylmethyldimethoxysilane (trade name, Silquest A-2120: manufactured by GE Toshiba Silicone Co., Ltd.) was put into the flask and then stirred. Next, 78 parts of ion-exchange water was gradually added to the flask from the dropping funnel while flowing a very small amount of nitrogen into the flask. Since an exothermic reaction was generated, a temperature of the content in the flask was controlled by cooling, so that it was kept at 60° C. or lower.

After the dropping of the ion-exchange water was completed, the temperature in the flask was elevated up to 80° C., and methanol being a reaction by-product was distilled off in a receiving bath. At this time, the pressure was reduced as needed, while checking the distilled amount (257 parts) of methanol. After the reaction completion, the temperature was cooled to 40° C. or lower, and a reaction product was taken out from the flask. Thus, 688 parts of faint-yellow transparent amino-functional polyorganosiloxane (E) was obtained. The amino-functional polyorganosiloxane (E) had a viscosity of 236 mPa·s, and a heating loss of 0.7% under the condition of 150° C. in 1 hour.

Synthesis Example 6

Instead of the N-(β-aminoethyl)-aminopropylmethyldimethoxysilane, γ-aminopropylmethyldiethoxysilane (trade name, Silquest A-2100: manufactured by GE Toshiba Silicone Co., Ltd.) was used, and in the same manner as in the synthesis example 5, 678 parts of amino-functional polyorganosiloxane (F) having 264 mPa·s of viscosity and 0.6% of heating loss under the condition of 150° C. in 1 hour was obtained.

Synthesis Example 7

By using 900 parts of N-(β-aminoethyl)-aminopropylmethyldimethoxysilane, and 450 parts of ion-exchange water, methanol and an excess of water were distilled off under the reduced pressure of 2.5 kPa or lower at 140° C. with the same device and operation as in the synthesis example 5. After the reaction, the temperature was cooled to 40° C. or lower, and a reaction product was taken out from the flask. Thus, 631 parts of light-yellow transparent amino-functional polyorganosiloxane (G) was obtained. The amino-functional polyorganosiloxane (G) had a viscosity of 3.2 mPa·s, and a heating loss of 0.2% under the condition of 150° C. in 1 hour.

Example 1

3.0 parts of vinyl trimethoxysilane (trade name, Silquest A-171: manufactured by GE Toshiba Silicone Co., Ltd.) was added to 100 parts of the reactive silicon group-containing polypropylene polymer (A) obtained in the synthesis example 1, and they are mixed uniformly at room temperature for 20 minutes, and thereafter, 100 parts of synthetic calcium carbonate (trade name, HAKUENKA CCR: manufactured by Shiraishi Industrial Co., Ltd.) being treated with fatty acid, and 50 parts of heavy calcium carbonate (trade name, WHITEN SSB: manufactured by Shiraishi Industrial Co., Ltd.) were respectively added thereto, and mixed uniformly.

Next, 60 parts of dioctyl phthalate as a plasticizer was added, and after heating and mixing under the reduced pressure at 100° C. for 3 hours, the temperature was cooled to 50° C. or lower. Thereafter, 2.0 parts of the amino-functional polyorganosiloxane (E) obtained in the synthesis example 5, 2.0 parts of vinyl trimethoxysilane, and 0.3 part of dibutyltin dilaurate were respectively added and mixed uniformly, to thereby obtain a silicon group-containing polymer composition.

Examples 2 and 3

In an example 2, 2.0 parts of the amino-functional polyorganosiloxane (F) obtained in the synthesis example 6 was blended instead of the 2.0 parts of the amino-functional polyorganosiloxane (E), and by conducting the same operation as in the example 1, a silicon group-containing polymer composition was obtained. In an example 3, 3.0 parts of the amino-functional polyorganosiloxane (G) obtained in the synthesis example 7 was blended instead of the 2.0 parts of the amino-functional polyorganosiloxane (E), and by conducting the same operation as in the example 1, a silicon group-containing polymer composition was obtained.

Examples 4 to 6

In an example 4, the reactive silicon group-containing polypropylene polymer (B) obtained in the synthesis example 2 was used instead of the reactive silicon group-containing polypropylene polymer (A), and by conducting the same operation as in the example 1, a silicon group-containing polymer composition was obtained. In examples 5 and 6, the reactive silicon group-containing polypropylene polymers (C) and (D) obtained in the synthesis examples 3 and 4 were respectively used instead of the reactive silicon group-containing polypropylene polymers (A), and by conducting the same operation as in the example 1, silicon group-containing polymer compositions were obtained.

Example 7

3.0 parts of vinyl trimethoxysilane (trade name, Silquest A-171) was added to 100 parts of the reactive silicon group-containing polypropylene polymer (A) obtained in the synthesis example 1, and they are mixed uniformly at room temperature for 20 minutes, and thereafter, 100 parts of synthetic calcium carbonate (trade name, CALFINE 200: manufactured by Maruo Calcium Co., Ltd.) being treated with fatty acid, and 50 parts of heavy calcium carbonate (trade name, WHITEN SB: manufactured by Shiraishi Industrial Co., Ltd.) were respectively added thereto, and mixed uniformly.

Next, after heating and mixing under the reduced pressure at 100° C. for 3 hours, the temperature was cooled to 50° C. or lower. Subsequently, 2.0 parts of the amino-functional polyorganosiloxane (E) obtained in the synthesis example 5, 2.0 parts of γ-glycidoxypropyltrimethoxysilane (trade name, Silquest A-187: manufactured by GE Toshiba Silicone Co., Ltd.), 2.0 parts of vinyl trimethoxysilane, and 0.3 part of dibutyltin dilaurate were respectively added and mixed uniformly, to thereby obtain a silicon group-containing polymer composition.

Example 8

γ-glycidoxypropylmethyldiethoxysilane (trade name, Wetlink 78: manufactured by GE Toshiba Silicone Co., Ltd.) was used in place of the γ-glycidoxypropyltrimethoxysilane, and by conducting the same operation as in the example 7, a silicon group-containing polymer composition was obtained.

Comparative Examples 1 to 4

In a comparative example 1, N-(β-aminoethyl)-aminopropyltrimethoxysilane (trade name, Silquest A-1120: manufactured by GE Toshiba Silicone Co., Ltd.) was used instead of the amino-functional polyorganosiloxane (E), and by conducting the same operation as in the example 1, a silicon group-containing polymer composition was obtained. In comparative examples 2 to 4, N-(β-aminoethyl)-aminopropylmethyldimethoxysilane (trade name, Silquest A-2120) (comparative example 2), γ-aminopropyltriethoxysilane (trade name, Silquest A-1100: manufactured by GE Toshiba Silicone Co., Ltd.) (comparative example 3), and γ-aminopropylmethyldiethoxysilane (trade name, Silquest A-2100) (comparative example 4) were respectively used instead of the amino-functional polyorganosiloxanes (E), and by conducting the same operations as in the example 1, silicon group-containing polymer compositions were obtained.

Next, regarding each of the silicon group-containing polymer compositions respectively obtained in the examples 1 to 8, and in the comparative examples 1 to 4, an initial finger touch drying time and physical properties were measured, and storage stability was examined. Further, adhesiveness is respectively measured under normal condition and under water immersion condition. Furthermore, to examine durability, H-type tensile adhesion was measured.

Note that the finger touch drying time, the physical properties, the storage stability, the adhesiveness, and the H-type tensile adhesion were respectively measured as follows.

(a) Finger touch drying time: After a composition was subjected to an atmosphere of 23° C. and 50% RH, the time until the composition reached a dry state that was confirmed by touching the surface thereof with a finger was measured.

(b) Physical properties: The composition was pushed out in a sheet shape of 2 mm in thickness, the sheet was cured by moisture in the air by being allowed to stand at 23° C. and RH of 50% for 168 hours, and then; a hardness, a tensile strength, and an elongation of the cured product were measured according to JIS K6301.

(c) Storage stability: The composition was put into a container where no moisture exists, and after heating it at 70° C. for 5 days, the finger touch drying time was measured in the atmosphere of 23° C. and 50% RH. Further, the composition was pushed out in a sheet shape of 2 mm in thickness, and was cured by moisture in the air by being allowed to stand at 23° C. and RH of 50% for 168 hours, and then, as in the same manner as in the aforementioned (b), the physical properties of the cured product were measured according to JIS K6301.

(d) Adhesiveness: According to JIS K6301, a cohesive failure ratio was measured by using copper, iron, stainless steel, a glass, polyvinyl chloride (PVC), polyethylene telephthalate (PET), 6-nylon, and 6,6-nylon, respectively as an adherend. Further, the adhesiveness (cohesive failure ratio) was measured in the same manner after standing for 1 week, and 2 weeks in water immersion condition at 50° C.

(e) H-type tensile adhesion: A durability (H-type tensile adhesion) test was conducted according to JIS A1439. A tensile stress at 50% elongation (M50), a maximum tensile stress (Tmax), an elongation at maximum load (Emax), and an adhesiveness (cohesive failure ratio) with respect to anodized aluminum in sulfuric acid (JIS A5758) and a glass (CF Al and CF Gl) were respectively measured at the initial stage, after standing for 1 week in water immersion condition at 50° C., and after standing for 2 weeks in water immersion condition at 50° C. Note that a pre-curing condition was at 23° C. and RH of 50% for 14 days, and a post-curing condition was at 30° C. for 14 days.

The measured results were shown in Table 1 and Table 2.

TABLE 1

| | | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|
| INITIAL STAGE | FINGER TOUCH DRYING TIME (MINUTE) | | 20 | 20 | 22 | 15 | 20 | 20 | 25 |
| | HARDNESS (JIS A) | | 35 | 33 | 32 | 39 | 42 | 35 | 29 |
| | TENSILE STRENGTH (MPa) | | 1.28 | 1.24 | 1.20 | 1.97 | 1.78 | 2.20 | 1.34 |
| | ELONGATION (%) | | 380 | 390 | 410 | 230 | 320 | 180 | 460 |
| AFTER HEATING | FINGER TOUCH DRYING TIME (MINUTE) | | 21 | 21 | 23 | 15 | 21 | 21 | 25 |
| | HARDNESS (JIS A) | | 35 | 32 | 31 | 38 | 41 | 35 | 27 |
| | TENSILE STRENGTH (MPa) | | 1.27 | 1.22 | 1.18 | 1.81 | 1.67 | 2.13 | 1.32 |
| | ELONGATION (%) | | 370 | 400 | 430 | 240 | 310 | 190 | 470 |
| H-TYPE TENSILE ADHESION | INITIAL STAGE | M50 (kgf/cm$^2$) | 3.72 | 3.63 | 3.60 | 5.22 | 5.72 | 6.12 | 3.50 |
| | | Tmax (kgf/cm$^2$) | 12.67 | 12.27 | 12.17 | 13.87 | 18.45 | 19.67 | 11.55 |
| | | Emax (%) | 298 | 314 | 328 | 157 | 195 | 148 | 222 |
| | | CF Al (%) | 100 | 100 | 100 | 100 | 100 | 100 | 100 |
| | | CF Gl (%) | 100 | 100 | 100 | 100 | 100 | 100 | 100 |

TABLE 1-continued

|  |  |  |  |  |  |  |  |  |  |
|---|---|---|---|---|---|---|---|---|---|
|  | AFTER 1 WEEK UNDER WATER IMMERSION STATE | M50 (kgf/cm²) | 3.35 | 3.25 | 2.95 | 4.88 | 3.35 | 3.35 | 3.31 |
|  |  | Tmax (kgf/cm²) | 8.38 | 8.01 | 7.88 | 9.24 | 12.22 | 13.66 | 8.12 |
|  |  | Emax (%) | 317 | 325 | 337 | 185 | 217 | 185 | 238 |
|  |  | CF A1 (%) | 100 | 100 | 100 | 100 | 100 | 100 | 100 |
|  |  | CF G1 (%) | 100 | 100 | 100 | 100 | 100 | 100 | 100 |
|  | AFTER 2 WEEKS UNDER WATER IMMERSION STATE | M50 (kgf/cm²) | 3.18 | 2.98 | 2.85 | 4.48 | 3.18 | 3.18 | 3.20 |
|  |  | Tmax (kgf/cm²) | 8.28 | 7.88 | 7.45 | 8.28 | 11.28 | 11.87 | 7.98 |
|  |  | Emax (%) | 320 | 330 | 350 | 220 | 230 | 190 | 278 |
|  |  | CF A1 (%) | 100 | 100 | 100 | 100 | 100 | 100 | 100 |
|  |  | CF G1 (%) | 100 | 100 | 100 | 100 | 100 | 100 | 100 |

|  |  |  | EXAMPLE 8 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| INITIAL STAGE | FINGER TOUCH DRYING TIME (MINUTE) |  | 25 | 20 | 20 | 22 | 24 |
|  | HARDNESS (JIS A) |  | 27 | 36 | 32 | 36 | 31 |
|  | TENSILE STRENGTH (MPa) |  | 1.51 | 1.33 | 1.13 | 1.33 | 1.11 |
|  | ELONGATION (%) |  | 590 | 320 | 510 | 320 | 540 |
| AFTER HEATING | FINGER TOUCH DRYING TIME (MINUTE) |  | 25 | 22 | 22 | 24 | 26 |
|  | HARDNESS (JIS A) |  | 26 | 35 | 30 | 35 | 30 |
|  | TENSILE STRENGTH (MPa) |  | 1.50 | 1.27 | 1.07 | 1.27 | 1.05 |
|  | ELONGATION (%) |  | 610 | 330 | 480 | 360 | 570 |
| H-TYPE TENSILE ADHESION | INITIAL STAGE | M50 (kgf/cm²) | 3.14 | 3.87 | 2.97 | 3.75 | 2.44 |
|  |  | Tmax (kgf/cm²) | 12.52 | 12.87 | 10.81 | 12.87 | 10.22 |
|  |  | Emax (%) | 443 | 254 | 424 | 284 | 454 |
|  |  | CF A1 (%) | 100 | 100 | 100 | 100 | 10 |
|  |  | CF G1 (%) | 100 | 100 | 50 | 100 | 100 |
|  | AFTER 1 WEEK UNDER WATER IMMERSION STATE | M50 (kgf/cm²) | 3.27 | 3.13 | 2.13 | 2.93 | 1.89 |
|  |  | Tmax (kgf/cm²) | 8.26 | 5.86 | 4.16 | 5.86 | 3.41 |
|  |  | Emax (%) | 453 | 374 | 324 | 174 | 352 |
|  |  | CF A1 (%) | 100 | 100 | 100 | 0 | 0 |
|  |  | CF G1 (%) | 100 | 1 | 0 | 100 | 100 |
|  | AFTER 2 WEEKS UNDER WATER IMMERSION STATE | M50 (kgf/cm²) | 3.04 | 2.17 | 1.47 | 2.41 | 1.67 |
|  |  | Tmax (kgf/cm²) | 8.01 | 4.99 | 2.99 | 4.99 | 2.75 |
|  |  | Emax (%) | 478 | 395 | 353 | 155 | 345 |
|  |  | CF A1 (%) | 100 | 100 | 100 | 0 | 0 |
|  |  | CF G1 (%) | 100 | 0 | 0 | 80 | 25 |

TABLE 2

|  |  |  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|
| ADHESIVE-NESS COHESIVE FAILURE RATIO (%) | INITIAL STAGE | COPPER | 100 | 100 | 100 | 100 | 100 | 100 | 100 |
|  |  | IRON | 100 | 100 | 100 | 100 | 100 | 100 | 100 |
|  |  | STAINLESS STEEL | 100 | 100 | 100 | 100 | 100 | 100 | 100 |
|  |  | GLASS | 100 | 100 | 100 | 100 | 100 | 100 | 100 |
|  |  | PVC | 100 | 100 | 100 | 100 | 100 | 100 | 100 |
|  |  | PET | 100 | 100 | 100 | 100 | 100 | 100 | 100 |
|  |  | 6-NYLON | 100 | 100 | 100 | 100 | 100 | 100 | 100 |
|  |  | 6,6-NYLON | 100 | 100 | 100 | 100 | 100 | 100 | 100 |
|  | AFTER 1 WEEK UNDER WATER IMMERSION STATE | COPPER | 100 | 100 | 100 | 100 | 100 | 100 | 100 |
|  |  | IRON | 100 | 100 | 100 | 100 | 100 | 100 | 100 |
|  |  | STAINLESS STEEL | 100 | 100 | 100 | 100 | 100 | 100 | 100 |
|  |  | PVC | 100 | 100 | 100 | 100 | 100 | 100 | 100 |
|  |  | PET | 100 | 100 | 100 | 100 | 100 | 100 | 100 |
|  |  | 6-NYLON | 100 | 100 | 100 | 100 | 100 | 100 | 100 |
|  |  | 6,6-NYLON | 100 | 100 | 100 | 100 | 100 | 100 | 100 |
|  | AFTER 2 WEEKS UNDER WATER IMMERSION STATE | COPPER | 95 | 100 | 90 | 100 | 100 | 95 | 100 |
|  |  | IRON | 100 | 100 | 100 | 100 | 100 | 100 | 100 |
|  |  | STAINLESS STEEL | 100 | 100 | 100 | 100 | 100 | 95 | 100 |

TABLE 2-continued

|  |  |  |  |  |  |  |  |
|---|---|---|---|---|---|---|---|
| PVC | 100 | 100 | 100 | 100 | 100 | 90 | 100 |
| PET | 100 | 100 | 100 | 100 | 100 | 85 | 100 |
| 6-NYLON | 95 | 100 | 100 | 100 | 100 | 100 | 100 |
| 6,6-NYLON | 100 | 100 | 100 | 100 | 100 | 100 | 100 |

| | | | EXAMPLE 8 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| ADHESIVE-NESS COHESIVE FAILURE RATIO (%) | INITIAL STAGE | COPPER | 100 | 100 | 100 | 100 | 100 |
| | | IRON | 100 | 100 | 100 | 95 | 100 |
| | | STAINLESS STEEL | 100 | 100 | 80 | 95 | 80 |
| | | GLASS | 100 | 100 | 80 | 100 | 0 |
| | | PVC | 100 | 100 | 15 | 95 | 0 |
| | | PET | 100 | 100 | 100 | 100 | 0 |
| | | 6-NYLON | 100 | 100 | 0 | 100 | 0 |
| | | 6,6-NYLON | 100 | 100 | 0 | 100 | 0 |
| | AFTER 1 WEEK UNDER WATER IMMERSION STATE | COPPER | 100 | 95 | 0 | 90 | 0 |
| | | IRON | 100 | 100 | 5 | 100 | 0 |
| | | STAINLESS STEEL | 100 | 90 | 0 | 80 | 0 |
| | | PVC | 100 | 0 | 0 | 0 | 0 |
| | | PET | 100 | 0 | 10 | 0 | 0 |
| | | 6-NYLON | 100 | 0 | 0 | 0 | 0 |
| | | 6,6-NYLON | 100 | 0 | 0 | 0 | 0 |
| | AFTER 2 WEEKS UNDER WATER IMMERSION STATE | COPPER | 100 | 90 | 0 | 80 | 0 |
| | | IRON | 100 | 100 | 0 | 100 | 0 |
| | | STAINLESS STEEL | 100 | 80 | 0 | 50 | 0 |
| | | PVC | 100 | 0 | 0 | 0 | 0 |
| | | PET | 100 | 0 | 0 | 0 | 0 |
| | | 6-NYLON | 100 | 0 | 0 | 0 | 0 |
| | | 6,6-NYLON | 100 | 0 | 0 | 0 | 0 |

As confirmed from the Table 1 and Table 2, the silicon group-containing polymer compositions obtained in the examples 1 to 8 are excellent in the curing property, the adhesiveness and the storage stability, and cured products thereof possess the good physical properties. Further, they are excellent in hot water resistance, and the degree of decrease in adhesiveness is quite small even under the water immersion state, compared to the compositions obtained in the comparative examples 1 to 4.

Synthesis Example 8

2,000 parts of polyoxypropylene diol (trade name, PREMINOL: manufactured by Asahi Glass Co., Ltd.) having a viscosity of 16,000 mPa·s was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 44.8 parts of γ-isocyanate propyltrimethoxysilane (trade name, Silquest A-link35) was put therein so that the NCO/OH ratio became 0.97, and after the temperature was raised under the nitrogen gas flow, they were kept stirred for 8 hours at a temperature of 60° C. to 70° C. When the NCO content ratio was measured, it was decreased to 0.05% (theoretical value 0%), so that the content was taken out after being cooled. Thus, a reactive silicon group-containing polypropylene polymer (H) having each of its two ends terminated with a reactive silicon group was obtained. The viscosity of the polymer was 20,800 mPa·s.

Synthesis Example 9

2,000 parts of polyoxypropylene diol (trade name, PREMINOL: manufactured by Asahi Glass Co., Ltd.) having a viscosity of 16,000 mPa·s was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 44.8 parts of γ-isocyanate propylmethyldimethoxysilane (trade name, Silquest A-link25: manufactured by GE Toshiba Silicone Co., Ltd.) was put therein so that the NCO/OH ratio became 0.97, and after the temperature was raised under the nitrogen gas flow, they were kept stirred for 8 hours at a temperature of 60° C. to 70° C. When the NCO content ratio was measured, it was decreased to 0.06% (theoretical value 0%), so that the content was taken out after being cooled. Thus, a reactive silicon group-containing polypropylene polymer (I) having each of its two ends terminated with a reactive silicon group was obtained. The viscosity of the polymer was 21,000 mPa·s.

Synthesis Example 10

2,000 parts of hydroxypolyoxypropylene having a hydroxyl group at one end thereof with a viscosity of 3,000 mPa·s was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 91.2 parts of γ-isocyanate propyltrimethoxysilane (trade name, Silquest A-link35) was put therein so that the NCO/OH ratio became 0.97, and after the temperature was raised under the nitrogen gas flow, they were kept stirred for 8 hours at a temperature of 60° C. to 70° C. When the NCO content ratio was measured, it was decreased to 0.05% (theoretical value 0%), so that the content was taken out after being cooled.

Thus, a reactive silicon group-containing polypropylene polymer (J) having a reactive silicon group at one end thereof was obtained. The viscosity of the polymer was 3,220 mPa·s.

Synthesis Example 11

In the same manner as in the synthesis example 10 except that the hydroxypolyoxypropylene having a hydroxyl group at one end thereof with a viscosity of 3,000 mPa·s used in the synthesis example 10 was changed to hydroxypolyoxypropylene having a hydroxyl group at one end thereof with a viscosity of 1,300 mPa·s, a reactive silicon group-containing polypropylene polymer (K) having a reactive silicon group at one end thereof was obtained. The viscosity of the polymer was 1,420 mPa·s.

Synthesis Example 12

In the same manner as in the synthesis example 10 except that the hydroxypolyoxypropylene having a hydroxyl group at one end thereof with a viscosity of 3,000 mPa·s used in the synthesis example 10 was changed to hydroxypolyoxypropylene having a hydroxyl group at one end thereof with a viscosity of 130 mPa·s, a reactive silicon group-containing polypropylene polymer (L) having a reactive silicon group at one end thereof was obtained. The viscosity of the polymer was 139 mPa·s.

Synthesis Example 13

In the same manner as in the synthesis example 10 except that the γ-isocyanate propyltrimethoxysilane used in the synthesis example 10 was changed to γ-isocyanate propylmethyldimethoxysilane, a reactive silicon group-containing polypropylene polymer (M) having a reactive silicon group at one end thereof was obtained. The viscosity of the polymer was 3,120 mPa·s.

Synthesis Example 14

After the air in a 2-liter four-necked separable flask equipped with an agitator, a dropping funnel, a reflux tube, a thermometer, a nitrogen gas flow device, and a pressure reducing device was substituted with nitrogen, 900 parts of N-(β-aminoethyl)-aminopropylmethyldimethoxysilane (trade name, Silquest A-2120) was put into the flask and then stirred. Next, 78 parts of ion-exchange water was gradually added to the flask from the dropping funnel while flowing a very small amount of nitrogen into the flask. Since an exothermic reaction was generated, a temperature of the content in the flask was controlled by cooling, so that it was kept at 60° C. or lower.

After the dropping of the ion-exchange water was completed, the temperature in the flask was elevated up to 80° C., and methanol being a reaction by-product was distilled off. At this time, the pressure was reduced as needed, while checking the distilled amount (257 parts) of methanol. After the reaction completion, the temperature was cooled to 40° C. or lower, and a reaction product was taken out from the flask. Thus, 688 parts of faint-yellow transparent amino-functional polyorganosiloxane (N) was obtained. The amino-functional polyorganosiloxane (N) had a viscosity of 253 mPa·s, and a heating loss of 0.6% under the condition of 150° C. in 1 hour.

Example 9

3.0 parts of vinyl trimethoxysilane (trade name, Silquest A-171) was added to a mixture of 50 parts of the reactive silicon group-containing polypropylene polymer (H) obtained in the synthesis example 8 and 50 parts of the reactive silicon group-containing polypropylene polymer (J) having a reactive silicon group at one end thereof obtained in the synthesis example 10, and they were mixed uniformly at room temperature for 20 minutes, and thereafter, 75 parts of synthetic calcium carbonate (trade name, HAKUENKA CCR: manufactured by Shiraishi Industrial Co., Ltd.) being treated with fatty acid, and 75 parts of heavy calcium carbonate (trade name, WHITEN SB) were respectively added thereto, and mixed uniformly.

Next, 60 parts of dioctyl phthalate as a plasticizer was added, and after heating and mixing under the reduced pressure at 100° C. for 3 hours, the temperature was cooled to 50° C. or lower. Thereafter, 2.0 parts of N-(β-aminoethyl)-aminopropyltrimethoxysilane (trade name, Silquest A-1120), 3.0 parts of vinyl trimethoxysilane, and 0.5 part of dibutyltin dilaurate were respectively added and mixed uniformly, to thereby obtain a silicon group-containing polymer composition.

Examples 10 and 11

In an example 10, the reactive silicon group-containing polypropylene polymer (K) having a reactive silicon group at one end thereof obtained in the synthesis example 11 was blended instead of the reactive silicon group-containing polypropylene polymer (J) having a reactive silicon group at one end thereof obtained in the synthesis example 10, and by conducting the same operation as in the example 9, a silicon group-containing polymer composition was obtained. In an example 11, the reactive silicon group-containing polypropylene polymer (L) having a reactive silicon group at one end thereof obtained in the synthesis example 12 was blended instead of the reactive silicon group-containing polypropylene polymer (J) having a reactive silicon group at one end thereof obtained in the synthesis example 10, and by conducting the same operation as in the example 9, a silicon group-containing polymer composition was obtained.

Example 12

3.0 parts of vinyl trimethoxysilane (trade name, Silquest A-171) was added to a mixture of 50 parts of the reactive silicon group-containing polypropylene polymer (I) obtained in the synthesis example 9 and 50 parts of the reactive silicon group-containing polypropylene polymer (M) having a reactive silicon group at one end thereof obtained in the synthesis example 13, and they were mixed uniformly at room temperature for 20 minutes, and thereafter, 75 parts of synthetic calcium carbonate (trade name, HAKUENKA CCR) being treated with fatty acid, and 75 parts of heavy calcium carbonate (trade name, WHITEN SB) were respectively added thereto, and mixed uniformly.

Next, 60 parts of dioctyl phthalate as a plasticizer was added, and after heating and mixing under the reduced pressure at 100° C. for 3 hours, the temperature was cooled to 50° C. or lower. Thereafter, 2.0 parts of N-(β-aminoethyl)-aminopropyltrimethoxysilane (trade name, Silquest A-1120), 1.0 part of 3-glycidoxypropyltrimethoxysilane, 2.0 parts of vinyl trimethoxysilane and 0.5 part of dibutyltin dilaurate were respectively added and mixed uniformly, to thereby obtain a silicon group-containing polymer composition.

Example 13

3.0 parts of vinyl trimethoxysilane (trade name, Silquest A-171) was added to a mixture of 50 parts of the reactive silicon group-containing polypropylene polymer (H) obtained in the synthesis example 8 and 50 parts of the reactive silicon group-containing polypropylene polymer (J) having a reactive silicon group at one end thereof obtained in the synthesis example 10, and they were mixed uniformly at room temperature for 20 minutes, and thereafter, 75 parts of synthetic calcium carbonate (trade name, HAKUENKA CCR) being treated with fatty acid, and 75 parts of heavy calcium carbonate (trade name, WHITEN SB) were respectively added thereto, and mixed uniformly.

Next, 60 parts of dioctyl phthalate as a plasticizer was added, and after heating and mixing under the reduced pressure at 100° C. for 3 hours, the temperature was cooled to 50° C. or lower. Thereafter, 2.0 parts of the amino-functional polyorganosiloxane obtained in the synthesis example 7, 1.0 part of 3-glycidoxypropyltrimethoxysilane, 2.0 parts of vinyl trimethoxysilane and 0.5 part of dibutyltin dilaurate were respectively added and mixed uniformly, to thereby obtain a silicon group-containing polymer composition.

Examples 14 and 15

In an example 14, the reactive silicon group-containing polypropylene polymer (K) having a reactive silicon group at one end thereof obtained in the synthesis example 11 was used instead of the reactive silicon group-containing polypropylene polymer (J) having a reactive silicon group at one end thereof obtained in the synthesis example 10, and by conducting the same operation as in the example 13, a silicon group-containing polymer composition was obtained. In an example 15, the reactive silicon group-containing polypropylene polymer (L) having a reactive silicon group at one end thereof obtained in the synthesis example 12 was used instead of the reactive silicon group-containing polypropylene polymer (J) having a reactive silicon group at one end thereof obtained in the synthesis example 10, and by conducting the same operation as in the example 13, a silicon group-containing polymer composition was obtained.

Comparative Example 5

3.0 parts of vinyl trimethoxysilane (trade name, Silquest A-171) was added to a mixture of 50 parts of a reactive silicon group-containing polypropylene polymer having an allyl group terminated with trimethoxysilane at each of both ends of its molecule (viscosity of 16,000 mPa·s) and 50 parts of a reactive silicon group-containing polypropylene polymer having an allyl group terminated with trimethoxysilane at one end of its molecule (viscosity of 3,000 mPa·s) and they were mixed uniformly at room temperature for 20 minutes, and thereafter, 75 parts of synthetic calcium carbonate (trade name, HAKUENKA CCR) being treated with fatty acid, and 75 parts of heavy calcium carbonate (trade name, WHITEN SB) were respectively added thereto, and mixed uniformly.

Next, 60 parts of dioctyl phthalate as a plasticizer was added, and after heating and mixing under the reduced pressure at 100° C. for 3 hours, the temperature was cooled to 50° C. or lower. Thereafter, 2.0 parts of N-(β-aminoethyl)-aminopropyltrimethoxysilane (trade name, Silquest A-1120), 3.0 parts of vinyl trimethoxysilane, and 0.5 part of dibutyltin dilaurate were respectively added and mixed uniformly, to thereby obtain a silicon group-containing polymer composition.

Comparative Example 6

A mixture of 50 parts of a reactive silicon group-containing polypropylene polymer having an allyl group terminated with methyldimethoxysilane at each of both ends of its molecule (viscosity of 16,000 mPa·s) and 50 parts of a reactive silicon group-containing polypropylene polymer having an allyl group terminated with methyldimethoxysilane at one end of its molecule (viscosity of 3,000 mPa·s) was used, and by conducting the same operation as in the comparative example 5, a silicon group-containing polymer composition was obtained.

Next, regarding each of the silicon group-containing polymer compositions respectively obtained in the examples 9 to 15, and in the comparative examples 5 and 6, a tensile test was conducted by manufacturing H-type specimens according to JIS A5758, in which the 50% modulus, the maximum tensile stress, the elongation at the maximum load and the adhesiveness (adherend: float glass) were respectively measured. Further, the tensile test was conducted with respect to each of the same specimens that were dipped in a hot water of 80° C. for 1 week, and the 50% modulus, the maximum tensile stress, the elongation at the maximum load and the adhesiveness (adherend: float glass) were respectively measured.

Further, the surface tackiness was measured in the following manner. Specifically, the composition was pushed out in a sheet shape of 5 mm in thickness, and was cured by moisture in the air by being allowed to stand at 20° C. and RH of 60% for 168 hours. Then, the state of the surface of the cured product was examined at the initial stage of curing, and after standing for 5 days at 70° C. The tackiness was examined by touching with finger and was evaluated based on the following criteria.

○: no residual tack (tackiness)
◆: a little residual tack
X: residual tack

The results of these evaluations are shown in Table 3. The abbreviations in the table, namely, Tmax, Emax, and CF ratio, respectively indicate a maximum tensile stress, an elongation at maximum load, and a cohesive failure ratio.

TABLE 3

|  |  |  | EXAMPLE 9 | EXAMPLE 10 | EXAMPLE 11 | EXAMPLE 12 | EXAMPLE 13 | EXAMPLE 14 |
|---|---|---|---|---|---|---|---|---|
| H-TYPE PHYSICAL PROPERTIES | INITIAL STAGE | 50% MODULUS (MPa) | 0.18 | 0.29 | 0.35 | 0.12 | 0.19 | 0.32 |
|  |  | Tmax (MPa) | 1.33 | 1.45 | 1.47 | 0.92 | 1.56 | 1.77 |
|  |  | Emax (%) | 650 | 520 | 440 | 750 | 790 | 620 |
|  |  | CF RATIO (%) | 100 | 100 | 100 | 100 | 100 | 100 |
|  | 1 WEEK UNDER WATER IMMERSION STATE | 50% MODULUS (MPa) | 0.13 | 0.23 | 0.27 | 0.08 | 0.17 | 0.28 |
|  |  | Tmax (MPa) | 1.02 | 1.13 | 1.16 | 0.54 | 1.47 | 1.62 |
|  |  | Emax (%) | 820 | 630 | 480 | 930 | 850 | 670 |
|  |  | CF RATIO (%) | 100 | 100 | 100 | 95 | 100 | 100 |
| SURFACE | INITIAL | AFTER 24 HOURS | ○-◆ | ◆ | ◆-X | ◆-X | ○ | ○-◆ |

TABLE 3-continued

| | | | | | | | | |
|---|---|---|---|---|---|---|---|---|
| TACKINESS | STAGE | | | | | | | |
| | | AFTER 72 HOURS | ○ | ○ | ○-♦ | ○-♦ | ○ | ○ |
| | | AFTER 168 HOURS | ○ | ○ | ○ | ○-♦ | ○ | ○ |
| | AFTER 5 DAYS AT 70° C. | AFTER 24 HOURS | ○-♦ | ♦ | ♦-X | X | ○ | ○-♦ |
| | | AFTER 72 HOURS | ○ | ○ | ○-♦ | ♦-X | ○ | ○ |
| | | AFTER 168 HOURS | ○ | ○ | ○ | ♦ | ○ | ○ |

| | | | | EXAMPLE 15 | COMPARATIVE EXAMPLE 5 | COMPARATIVE EXAMPLE 6 |
|---|---|---|---|---|---|---|
| | H-TYPE PHYSICAL PROPERTIES | INITIAL STAGE | 50% MODULUS (MPa) | 0.39 | 0.16 | 0.12 |
| | | | Tmax (MPa) | 1.82 | 0.99 | 0.84 |
| | | | Emax (%) | 510 | 710 | 880 |
| | | | CF RATIO (%) | 100 | 100 | 100 |
| | | 1 WEEK UNDER WATER IMMERSION STATE | 50% MODULUS (MPa) | 0.34 | 0.09 | 0.07 |
| | | | Tmax (MPa) | 1.69 | 0.65 | 0.45 |
| | | | Emax (%) | 580 | 880 | 820 |
| | | | CF RATIO (%) | 100 | 35 | 0 |
| | SURFACE TACKINESS | INITIAL STAGE | AFTER 24 HOURS | ♦ | X | INCAPABLE MEASUREMENT |
| | | | AFTER 72 HOURS | ○-♦ | ♦-X | X |
| | | | AFTER 168 HOURS | ○ | ♦ | ♦-X |
| | | AFTER 5 DAYS AT 70° C. | AFTER 24 HOURS | ♦ | INCAPABLE MEASUREMENT | INCAPABLE MEASUREMENT |
| | | | AFTER 72 HOURS | ○-♦ | X | X |
| | | | AFTER 168 HOURS | ○ | ♦-X | X |

As confirmed from the Table 3, the silicon group-containing polymer compositions obtained in the examples 9 to 15 are excellent in the curing property and the adhesiveness, and cured products thereof possess good mechanical properties. It is possible to obtain a cured product having good appearance and property with no residual tack on the surface thereof, compared to the compositions of the comparative examples 5 and 6.

Example 16

2,000 parts of polyoxypropylene diol (trade name, PREMINOL: manufactured by Asahi Glass Co., Ltd.) having Mn of 16,000 with a viscosity of 18,000 mPa·s was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 49.7 parts of γ-isocyanate propyl-trimethoxysilane (trade name, Silquest A-link35) was put therein so that the NCO/OH ratio became 0.97, and after the temperature was raised under the nitrogen gas flow, they were kept stirred for 8 hours at a temperature of 60° C. to 70° C. When the NCO content ratio was measured, it was decreased to 0.05% (theoretical value 0%), so that the content was taken out after being cooled. A reactive silicon group-containing polypropylene polymer having a viscosity of 20,200 mPa·s was thus obtained.

Next, 3.0 parts of vinyl trimethoxysilane (trade name, Silquest A-171) was added to 100 parts of the obtained reactive silicon group-containing polypropylene polymer, and they are mixed uniformly at room temperature for 20 minutes, and thereafter, 150 parts of heavy calcium carbonate (trade name, ESD-18: manufactured by Sankyo Seifun Co., Ltd.) being surface-treated with diethylene glycol was added thereto, and mixed uniformly. After that, 60 parts of dioctyl phthalate as a plasticizer was added, and after heating and mixing under the reduced pressure at 100° C. for 3 hours, the temperature was cooled to 50° C. or lower. Thereafter, 2.0 parts of N-(β-aminoethyl)-aminopropyltrimethoxysilane (trade name, Silquest A-1120), 3.0 parts of vinyl trimethoxysilane and 0.5 part of dibutyltin dilaurate were respectively added and mixed uniformly, to thereby obtain a silicon group-containing polymer composition.

Example 17

In the example 16, the blended amount of the heavy calcium carbonate being surface-treated with diethylene glycol was made to be 75 parts, and together with it, 75 parts of synthetic calcium carbonate (trade name, HAKUENKA CCR: manufactured by Shiraishi Industrial Co., Ltd.) being treated with fatty acid was blended. The same operation as in the example 16 was conducted except that point, to thereby obtain a silicon group-containing polymer composition.

Example 18

2,000 parts of polyoxypropylene diol (trade name, PREMINOL: manufactured by Asahi Glass Co., Ltd.) having Mn of 18,000 with a viscosity of 20,000 mPa·s was put into a 3-liter four-necked separable flask equipped with an agitator, a dropping funnel, a reflux tube, a thermometer, a nitrogen gas flow device, and a pressure reducing device, and was dehydrated by conducting distillation under reduced pressure at 100° C. under 10 mmHg to 20 mmHg for 1 hour. Next, it was cooled to 50° C. or lower, 43.3 parts of γ-isocyanate propyl-trimethoxysilane (trade name, Silquest A-link35) was put therein so that the NCO/OH ratio became 0.95, and after the temperature was raised under the nitrogen gas flow, they were kept stirred for 8 hours at a temperature of 60° C. to 70° C. When the NCO content ratio was measured, it was decreased to 0.06% (theoretical value 0%), so that the content was taken out after being cooled. A reactive silicon group-containing polypropylene polymer having a viscosity of 24,000 mPa·s was thus obtained.

Next, 3.0 parts of vinyl trimethoxysilane (trade name, Silquest A-171) was added to 100 parts of the obtained reactive silicon group-containing polypropylene polymer, and they are mixed uniformly at room temperature for 20 minutes, and thereafter, 150 parts of heavy calcium carbonate (trade name, ESD-2: manufactured by Sankyo Seifun Co., Ltd.) being surface-treated with diethylene glycol was added thereto, and mixed uniformly. After that, 60 parts of dioctyl phthalate as a plasticizer was added, and after heating and mixing under the reduced pressure at 100° C. for 3 hours, the temperature was cooled to 50° C. or lower. Thereafter, 2.0 parts of N-(β-aminoethyl)-aminopropyltrimethoxysilane (trade name, Silquest A-1120), 1.0 part of 3-glycidoxypropyltrimethoxysilane, 2.0 parts of vinyl trimethoxysilane and 0.5 part of dibutyltin dilaurate were respectively added and mixed uniformly, to thereby obtain a silicon group-containing polymer composition.

Example 19

Heavy calcium carbonate (trade name, ESD-18P: manufactured by Sankyo Seifun Co., Ltd.) being surface-treated with propylene glycol was used in place of the heavy calcium carbonate (trade name, ESD-18: manufactured by Sankyo Seifun Co., Ltd.) being surface-treated with diethylene glycol used in the example 16. The same operation as in the example 16 was conducted except that point, to thereby obtain a silicon group-containing polymer composition.

Example 20

In the example 17, instead of the 2.0 parts of the N-(β-aminoethyl)-aminopropyltrimethoxysilane (trade name, Silquest A-2120), 2.0 parts of 4-amino-3,3-dimethylbutyltrimethoxysilane was used. The same operation as in the example 17 was conducted except that point, to thereby obtain a silicon group-containing polymer composition.

Example 21

After the air in a 2-liter four-necked separable flask equipped with an agitator, a dropping funnel, a reflux tube, a thermometer, a nitrogen gas flow device, and a pressure reducing device was substituted with nitrogen, 900 parts of N-(β-aminoethyl)-aminopropylmethyldimethoxysilane (trade name, Silquest A-2120) was put into the flask and then stirred. Next, 78 parts of ion-exchange water was gradually added to the flask from the dropping funnel while flowing a very small amount of nitrogen into the flask. Since an exothermic reaction was generated, a temperature of the content in the flask was controlled by cooling, so that it was kept at 60° C. or lower.

After the dropping of the ion-exchange water was completed, the temperature in the flask was elevated up to 80° C., and methanol being a reaction by-product was distilled off. At this time, the pressure was reduced as needed, while checking the distilled amount (257 parts) of methanol. After the reaction completion, the temperature was cooled to 40° C. or lower, and a reaction product was taken out from the flask. Thus, 688 parts of faint-yellow transparent amino-functional polyorganosiloxane was obtained. The amino-functional polyorganosiloxane had a viscosity of 253 mPa·s and a heating loss of 0.6% under the condition of 150° C. in 1 hour.

In the example 16, instead of the 2.0 parts of the N-(β-aminoethyl)-aminopropyltrimethoxysilane (trade name, Silquest A-2120), 2.0 parts of the amino-functional polyorganosiloxane obtained in the aforementioned method was used, and by conducting the same operation as in the example 16 except that point, a silicon group-containing polymer composition was obtained.

Comparative Examples 7 to 9

A comparative example 7 was conducted such that in the example 16, heavy calcium carbonate (trade name, MC coat S-23: manufactured by Maruo Calcium Co., Ltd.) being treated with fatty acid was blended instead of the heavy calcium carbonate being surface-treated with diethylene glycol. Except that point, the same operation with the same components as in the example 16 was conducted, to thereby obtain a silicon group-containing polymer composition.

A comparative example 8 was conducted such that in the example 17, 150 parts of synthetic calcium carbonate (trade name, HAKUENKA CCR) being treated with fatty acid was blended instead of the heavy calcium carbonate being surface-treated with diethylene glycol. Except that point, the same operation with the same components as in the example 17 was conducted, to thereby obtain a silicon group-containing polymer composition.

A comparative example 9 was conducted such that in the example 18, heavy calcium carbonate (trade name, WHITEN SB blue: manufactured by Shiraishi Industrial Co., Ltd.) being treated with fatty acid was blended instead of the heavy calcium carbonate being surface-treated with diethylene glycol. Except that point, the same operation with the same components as in the example 18 was conducted, to thereby obtain a silicon group-containing polymer composition.

Comparative Examples 10 to 12

In order to improve the tack, in a comparative example 10, 1 part of an acrylic compound (trade name, Aronix M-309: manufactured by Toa Synthetic Chemical Industrial Co., Ltd.) was further blended with the silicon group-containing polymer composition obtained in the comparative example 7. In a comparative example 11 and in a comparative example 12, 1 part of an acrylic compound (trade name, Aronix M-309) was further blended with the silicon group-containing polymer composition obtained in the comparative example 8 and in the comparative example 9, to thereby respectively obtain a composition.

Next, regarding each of the silicon group-containing polymer compositions respectively obtained in the examples 16 to 21, and in the comparative examples 7 to 12, a surface tackiness (tackiness), a surface crack, and the change in color were examined, and adhesiveness was measured at the initial stage and under water immersion condition, respectively. The surface tackiness, the surface crack, the change in color, and the adhesiveness were respectively measured as follows.

(f) Surface Tackiness

The composition was pushed out in sheet shapes of 5 mm in thickness, and were allowed to stand for 24 hours, 72 hours, and 168 hours, respectively, under the atmosphere of 23° C. and 50% RH, and after that, the state of the surface of the cured product of the respective compositions was examined by touching with a finger, and the tackiness was evaluated based on the following criteria. Further, the tackiness of each of the obtained compositions which were heated at 70° C. for 5 days was evaluated in the same manner.

○: no residual tack (tackiness)
◆: a little residual tack (tackiness)
X: residual tack (tackiness)
(g) Surface Crack and Change in Color The surface of the cured product after being irradiated for 2,000 hours with the use of Sunshine Weather-O-Meter manufactured by Shimadzu Corporation was observed. Accordingly, the crack was evaluated based on the following criteria. Further, the presence/absence of the change in color was examined.
○: no cracks
◆: a little cracks
X: large cracks (h) Adhesiveness According to JIS K6301, a cohesive failure ratio was measured with respect to anodized aluminum in sulfuric acid (JIS A5758) (AL) and a float glass (FG), each of which was an adherend. Further, the cohesive failure ratio after standing for 14 days in water immersion condition at 50° C. was measured in the same manner.

The measured results were respectively shown in Table 4 and Table 5.

TABLE 4

|  |  |  | EXAMPLE 16 | EXAMPLE 17 | EXAMPLE 18 | EXAMPLE 19 | EXAMPLE 20 | EXAMPLE 21 |
|---|---|---|---|---|---|---|---|---|
| SURFACE TACKINESS | INITIAL STAGE | AFTER 24 HOURS | ○-◆ | ○-◆ | ○-◆ | ○-◆ | ○-◆ | ○-◆ |
|  |  | AFTER 72 HOURS | ○ | ○ | ○ | ○ | ○ | ○ |
|  |  | AFTER 168 HOURS | ○ | ○ | ○ | ○ | ○ | ○ |
|  | AFTER 5 DAYS AT 70° C. | AFTER 24 HOURS | ○-◆ | ◆ | ○-◆ | ○-◆ | ○-◆ | ○-◆ |
|  |  | AFTER 72 HOURS | ○ | ○-◆ | ○ | ○ | ○ | ○ |
|  |  | AFTER 168 HOURS | ○ | ○-◆ | ○ | ○ | ○ | ○ |
| FINE CRACK |  |  | ○ | ○ | ○ | ○ | ○ | ○ |
| COLOR CHANGE |  |  | NONE | NONE | NONE | NONE | NONE | NONE |
| ADHESIVE-NESS | INITIAL STAGE | AL | 100 | 100 | 100 | 100 | 100 | 100 |
|  |  | FG | 100 | 100 | 100 | 100 | 100 | 100 |
| COHESIVE FAILURE RATIO (%) | UNDER WATER IMMERSION STATE AT 50° C. FOR 14 DAYS | AL | 100 | 100 | 100 | 100 | 100 | 100 |
|  |  | FG | 100 | 100 | 100 | 100 | 100 | 100 |

TABLE 5

|  |  |  | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|---|
| SURFACE TACKINESS | INITIAL STAGE | AFTER 24 HOURS | X | X | X | ○-◆ |
|  |  | AFTER 72 HOURS | ◆-X | ◆ | ◆-X | ○ |
|  |  | AFTER 168 HOURS | ◆ | ○-◆ | ◆ | ○ |
|  | AFTER 5 DAYS AT 70° C. | AFTER 24 HOURS | X | X | X | ◆-X |
|  |  | AFTER 72 HOURS | X | ○-◆ | X | ◆ |
|  |  | AFTER 168 HOURS | ◆-X | ◆ | X | ○-◆ |
| FINE CRACK |  |  | X | ◆-X | X | ○ (NOTE 1) |
| COLOR CHANGE |  |  | NONE | NONE | SLIGHTLY TURNED TO YELLOW | SLIGHTLY TURNED TO YELLOW |
| ADHESIVE-NESS | INITIAL STAGE | AL | 100 | 100 | 85 | 100 |
|  |  | FG | 24 | 50 | 0 | 100 |
| COHESIVE FAILURE RATIO (%) | UNDER WATER IMMERSION STATE AT 50° C. FOR 14 DAYS | AL | 100 | 100 | 100 | 82 |
|  |  | FG | 24 | 50 | 0 | 100 |

|  |  |  | COMPARATIVE EXAMPLE 11 | COMPARATIVE EXAMPLE 12 |
|---|---|---|---|---|
| SURFACE TACKINESS | INITIAL STAGE | AFTER 24 HOURS | ○-◆ | ◆ |
|  |  | AFTER 72 HOURS | ○ | ○-◆ |
|  |  | AFTER 168 HOURS | ○ | ○-◆ |
|  | AFTER 5 DAYS AT 70° C. | AFTER 24 HOURS | ◆-X | X |
|  |  | AFTER 72 HOURS | ◆ | ◆-X |
|  |  | AFTER 168 HOURS | ○-◆ | ◆ |
| FINE CRACK |  |  | ○ (NOTE 2) | ○-◆ |
| COLOR CHANGE |  |  | SLIGHTLY TURNED TO YELLOW | SLIGHTLY TURNED TO YELLOW |

TABLE 5-continued

| | | | | |
|---|---|---|---|---|
| ADHESIVENESS COHESIVE FAILURE RATIO (%) | INITIAL STAGE | AL | 100 | 100 |
| | | FG | 100 | 100 |
| | UNDER WATER IMMERSION STATE AT 50° C. FOR 14 DAYS | AL | 67 | 17 |
| | | FG | 100 | 100 |

NOTE 1:
number of fine cracks 11
NOTE 2:
number of fine cracks 8

As confirmed from the measured results in the Table 4 and Table 5, the silicon group-containing polymer compositions obtained in the examples 16 to 21 have no residual tack on the surface of the cured product, rarely generates cracks and change in color, and are excellent in adhesiveness. Further, they are excellent in water resistance, so that the degree of decrease in adhesiveness is quite small even under the water immersion state, compared to the compositions obtained in the comparative examples 7 to 12.

INDUSTRIAL APPLICABILITY

A room temperature curable silicon group-containing polymer composition according to the present invention can attain good expression of initial adhesiveness and is excellent in water resistance, especially in hot water resistance, so that the degree of decrease in adhesiveness is quite small even under the state of being immersed in water such as condensation water. Further, residual tack and fine cracks are prevented from occurring on a surface of a cured product, which provides excellent workability. Therefore, the silicon group-containing polymer composition is suitably used as an elastic adhesive and a coating material in the electric and electronic fields, as an architectural sealing material, and the like.

What is claimed is:

1. A room temperature curable silicon group-containing polymer composition, comprising:
   (A) a reactive silicon group-containing polymer obtained through a urethane reaction between polyoxypropylene polyol whose number average molecular weight is 500 to 50,000 and γ-isocyanate propyltrialkoxysilane, having a main chain being substantially composed of polyoxypropylene, and having a reactive silicon-containing group represented by a formula:

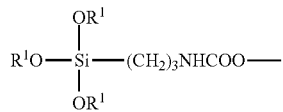

(wherein the $R^1$s are the same or different and each represents an alkyl group having 1 to 4 carbons) at an end of the main chain, and based on 100 parts by weight of said reactive silicon group-containing polymer;
   (B) 0.01 to 10 parts by weight of a curing catalyst; and
   (C) 0.05 to 25 parts by weight of hydrolyzed and condensed product of amino group-substituted alkoxysilane.

2. A room temperature curable silicon group-containing polymer composition, comprising:
   (A) a reactive silicon group-containing polymer obtained through a urethane reaction between polyoxypropylene polyol whose number average molecular weight is 500 to 50,000 and γ-isocyanate propyltrialkoxysilane, having a main chain being substantially composed of polyoxypropylene, and having a reactive silicon-containing group represented by a formula:

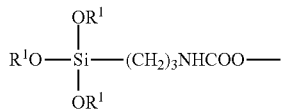

(wherein the $R^1$s are the same or different and each represents an alkyl group having 1 to 4 carbons) at an end of the main chain, and based on 100 parts by weight of said reactive silicon group-containing polymer;
   (B) 0.01 to 10 parts by weight of a curing catalyst;
   (C1) 0.05 to 25 parts by weight of amino group-substituted alkoxysilane; and
   (D) 1 to 500 parts by weight of heavy calcium carbonate being surface-treated with glycol that is liquid at room temperature, the glycol being at least one selected from the group consisting of ethylene glycol, propylene glycol, diethylene glycol, and 1,4-butanediol;
   wherein said (C1) amino group-substituted alkoxysilane is an alkoxysilane having an amino group-substituted alkyl group represented by the general formula: $(R^5O)_{3-k}R^6{}_k Si—R^7$,
   wherein $R^5$ and $R^6$ are the same or different and each represents an alkyl group;
   k is an integer of 0 (zero) to 2;
   $R^7$ represents an amino group-substituted alkyl group having a branch represented by the general formula: $—(CH_2)_p—CHR^8—(CH_2)_q—NH_2$ or the general formula: $—(CH_2)_p—C(R^8)_2—(CH_2)_q—NH_2$, wherein $R^8$ represents an alkyl group having 1 to 4 carbons, and p and q respectively represent an integer of 1 to 8, with the proviso that p+q is an integer of 9 or smaller.

* * * * *